(12) United States Patent
Kobayashi et al.

(10) Patent No.: US 10,798,149 B2
(45) Date of Patent: Oct. 6, 2020

(54) FILE STORAGE, OBJECT STORAGE, AND STORAGE SYSTEM

(71) Applicant: HITACHI, LTD., Tokyo (JP)

(72) Inventors: Masayuki Kobayashi, Tokyo (JP); Keiichi Matsuzawa, Tokyo (JP); Hitoshi Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 16/325,738

(22) PCT Filed: Feb. 24, 2017

(86) PCT No.: PCT/JP2017/007019
§ 371 (c)(1),
(2) Date: Feb. 15, 2019

(87) PCT Pub. No.: WO2018/154698
PCT Pub. Date: Aug. 30, 2018

(65) Prior Publication Data
US 2019/0215358 A1    Jul. 11, 2019

(51) Int. Cl.
*G06F 15/16* (2006.01)
*H04L 29/08* (2006.01)
*G06F 16/13* (2019.01)
*G06F 16/182* (2019.01)
*G06F 16/11* (2019.01)
(Continued)

(52) U.S. Cl.
CPC ............... *H04L 67/06* (2013.01); *G06F 3/06* (2013.01); *G06F 13/00* (2013.01); *G06F 16/116* (2019.01); *G06F 16/13* (2019.01); *G06F 16/183* (2019.01); *H04L 67/1097* (2013.01)

(58) Field of Classification Search
CPC ... H04L 67/06; H04L 67/1097; G06F 16/183; G06F 16/116; G06F 16/13; G06F 3/06
See application file for complete search history.

(56) References Cited

U.S. PATENT DOCUMENTS 6,029,189 A * 2/2000 Ishida ..................... G06F 3/061
                                                    718/105
8,306,230 B2 * 11/2012 Takakusu .............. H04L 9/0891
                                                    380/278
(Continued)

FOREIGN PATENT DOCUMENTS

JP           2005-292952 A        10/2005

OTHER PUBLICATIONS

International Search Report of PCT/JP2017/007019 dated May 9, 2017.

*Primary Examiner* — Moustafa M Meky
(74) *Attorney, Agent, or Firm* — Mattingly & Malur, PC

(57) ABSTRACT

When a part already transmitted to an object storage is updated by a file system management section while a plurality of parts are being transmitted to the object storage, a file transfer section requests the object storage to generate a temporary object that is a temporarily generated object containing the transmitted and updated part by combining the parts transmitted before update, re-splits a file into a plurality of parts so that the transmitted and updated data and not-transmitted data are handled as parts different from transmitted and not-updated data, and transmits the part containing the transmitted and updated data or the part containing the not-transmitted data to the object storage.

11 Claims, 15 Drawing Sheets

(51) Int. Cl.
     *G06F 13/00*        (2006.01)
     *G06F 3/06*         (2006.01)

(56) References Cited

U.S. PATENT DOCUMENTS

| | | | |
|---|---|---|---|
| 9,262,081 B2 * | 2/2016 | Ashida | G06F 3/0613 |
| 9,304,912 B1 * | 4/2016 | Zhang | G06F 11/1084 |
| 10,069,894 B2 * | 9/2018 | Liao | H04L 67/06 |
| 10,341,035 B2 * | 7/2019 | Delmas | H04N 21/23113 |
| 2009/0129588 A1 * | 5/2009 | Takakusu | H04L 9/0891 |
| | | | 380/42 |
| 2014/0344392 A1 * | 11/2014 | Ozawa | H04N 21/64784 |
| | | | 709/213 |
| 2015/0127773 A1 * | 5/2015 | Liao | H04L 43/0852 |
| | | | 709/217 |
| 2015/0358692 A1 * | 12/2015 | Markovitz | H04N 21/231 |
| | | | 725/93 |

* cited by examiner

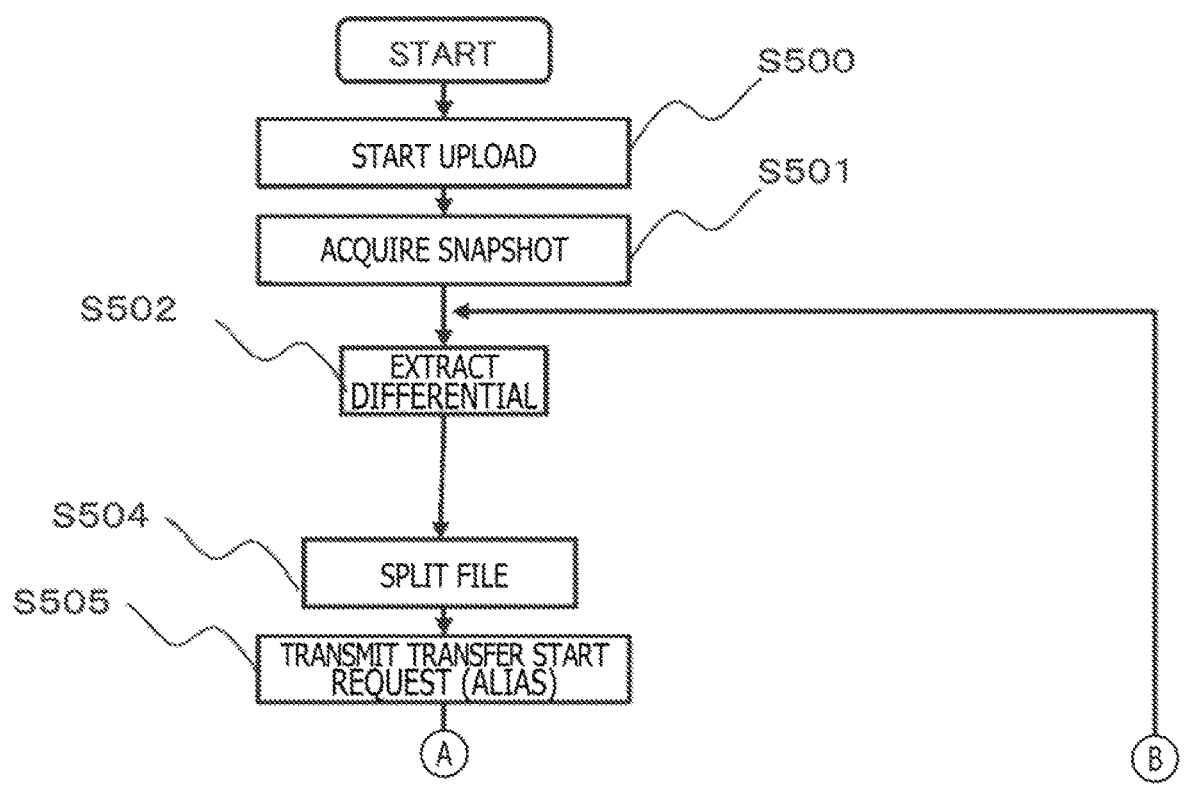

TIME OF STARTING TRANSFER

TIME OF OCCURRENCE OF UPDATE DURING TRANSFER

TIME OF PART RECONFIGURATION

| OBJECT NAME | OFFSET | SIZE | STATE | TEMPORARY OBJECT |
|---|---|---|---|---|
| abc-efg | 0 | 33554432 | NOT COMPLETED | |
| abc-efg | 33554432 | 134217728 | COMPLETED | |
| abc-efg | 167772160 | 16777216 | NOT COMPLETED | tmp-A-abc-efg |
| zyx-wvt | 0 | 104857600 | COMPLETED | |

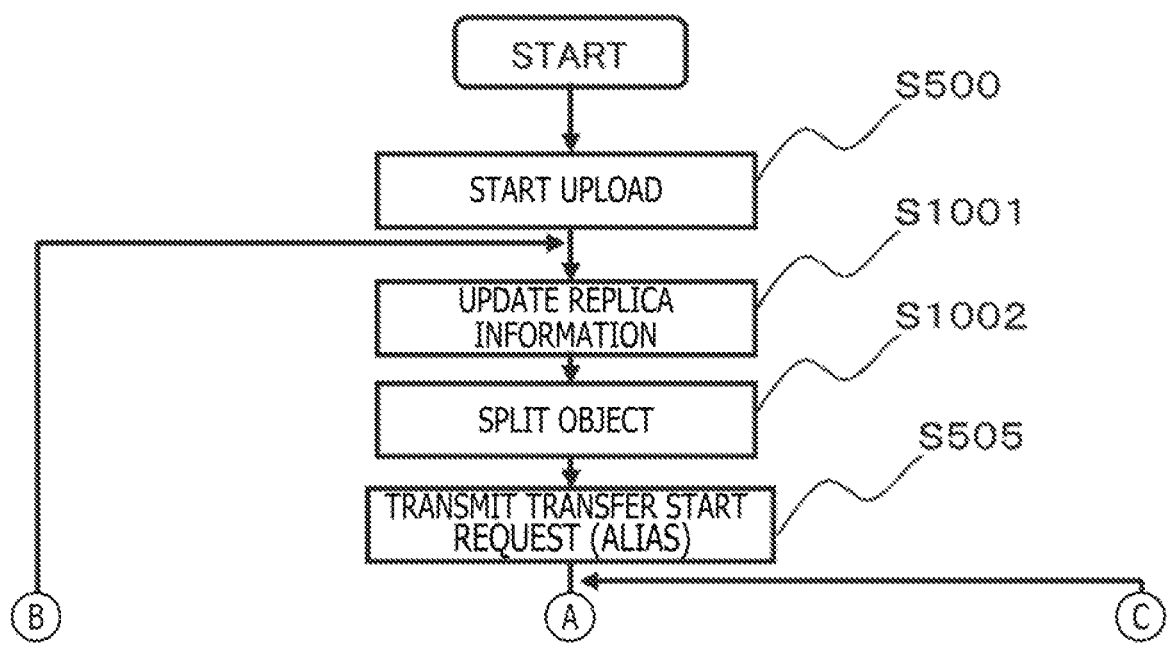

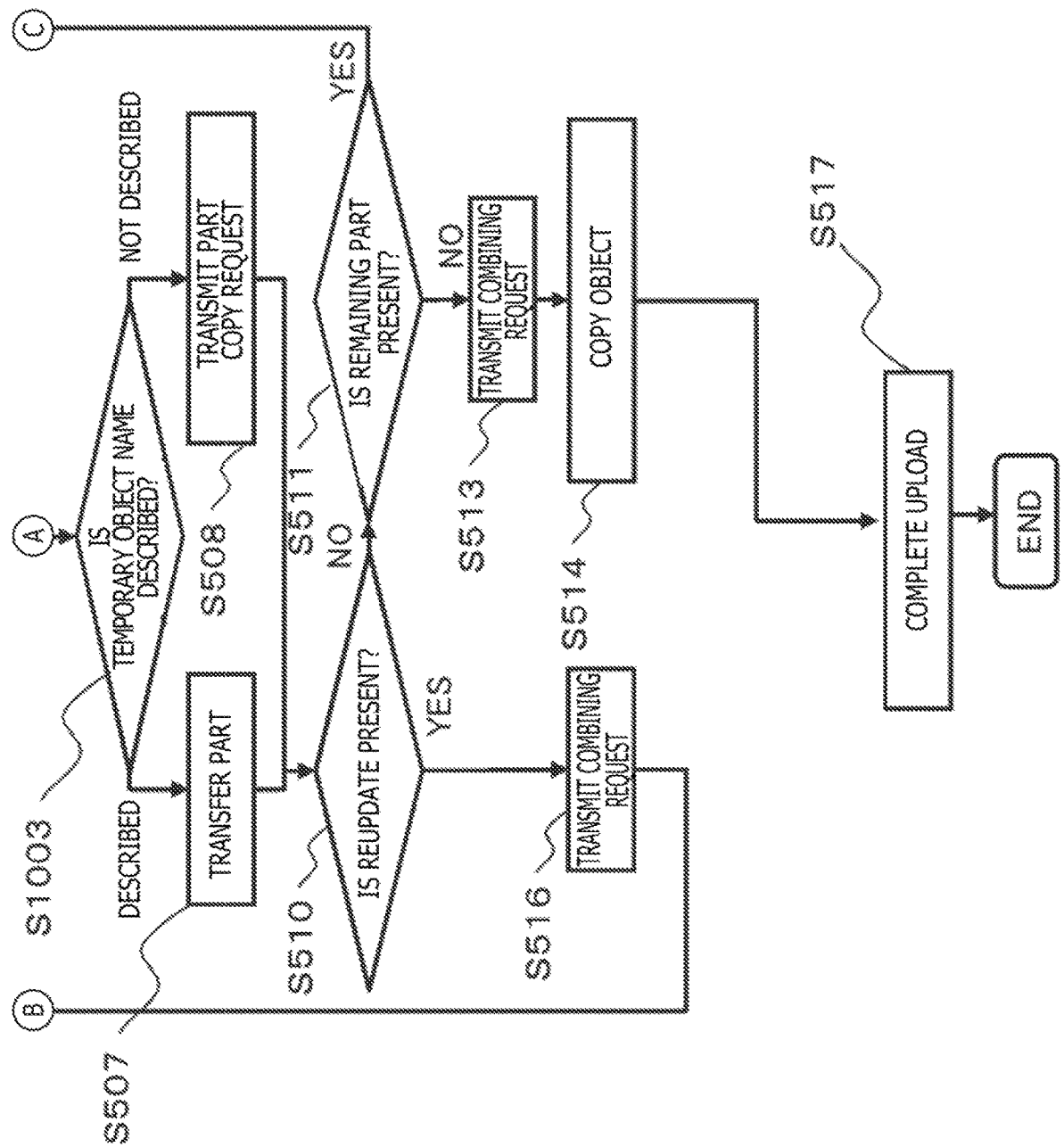

FILE STORAGE, OBJECT STORAGE, AND STORAGE SYSTEM

TECHNICAL FIELD

The present invention relates to a storage system.

BACKGROUND ART

There is known a technique that a network-connected storage NAS (Network Attached Storage), which records and reproduces data in units of files from an information apparatus such as a personal computer, copies the data to another storage at a remote location for the purpose of data backup and data sharing.

JP-2005-292952-A (Patent Document 1) discloses that "a first data transfer module sends update data to be written into a primary volume to a second data transfer module; the second data transfer module stores the update data into a secondary volume, stores differential data written to a storage address for the update data in the secondary volume into a second differential volume, updates a second management information holding module, and then informs completion of the data updating to the first data transfer module; and the first data transfer module stores the update data to an update address in the primary volume when the information of completion of the data updating is received from the second data transfer module, stores the differential data into a first differential volume, and updates a first management information holding module."

PRIOR ART DOCUMENT

Patent Document

Patent Document 1: JP-2005-292952-A

SUMMARY OF THE INVENTION

Problem to be Solved by the Invention

An object storage or a cloud storage having a REST interface using an HTTP protocol stores data in units of objects. At a time of storing a large-sized object in this object storage, an API called Multipart Upload API is often used. This API is used to split an object into a plurality of parts and to upload each part into the object storage.

Combining the technique (part transfer technique) for splitting the object into parts and transferring the parts as in this API with the technique (differential upload technique) for transferring the differential data as mentioned in Background Art, and handling files as objects make it possible to upload only file differential data from a NAS to the object storage in a state of storing before-update file data in the object storage in advance, and to copy a file updated in the NAS to the object storage. Uploading only the differential data to copy the file is referred to as "differential upload."

An actual differential upload process is performed such that when a file corresponding to an object already transferred from the NAS to the object storage and stored in the object storage is updated in the NAS, only data about an updated portion is transferred from the NAS to the object storage and the object in the object storage is updated using the transferred data.

In many types of object storages using the differential upload technique, an upper limit is set to the number of parts into which a file is split. Furthermore, reducing a part size causes a reduction in data transfer efficiency. It is, therefore, preferable that the part size is large.

However, with many APIs, which are typified by the Multipart Upload, using the part transfer technique, a file storage, which is typified by the NAS, splits a file into a plurality of parts, assigns serial numbers to the parts, and transmits the parts to the object storage. The object storage then combines the parts in order of the serial numbers, thereby reconstructing the file. Owing to these, it is difficult to change the size of the parts already uploaded to the object storage. This is because changing the size of the parts already received by the object storage results in the collapse of the serial numbers or the destruction of data.

Furthermore, inability to change the part size requires retransmission of the entire parts when a portion of the large-sized parts already uploaded to the object storage is updated in the NAS, which involves waste of retransfer of not-updated data.

An object of the present invention is to provide a technique of a storage system that splits a file into parts and that transfer the parts, the storage system capable of efficiently retransmitting data in a case of updating an already transferred part.

Means for Solving the Problems

According to one aspect of the present invention, a file storage that manages a file and that transfers the file to an object storage includes: a network interface section that transmits and receives data through a communication network; a file system management section that manages the file; and a file transfer section that splits the file into a plurality of parts and that transmits the plurality of parts to the object storage, in which, when one of the parts already transmitted to the object storage is updated by the file system management section while the plurality of parts are being transmitted to the object storage, the file transfer section requests the object storage to generate a temporary object that is a temporarily generated object containing the transmitted and updated part by combining the parts transmitted before update, re-splits the file into a plurality of parts so that the transmitted and updated data and not-transmitted data are handled as parts different from a part containing transmitted and not-updated data, and transmits the part containing the transmitted and updated data or the part containing the not-transmitted data to the object storage.

In this way, when the part transmitted to the object storage is updated, then a plurality of parts containing the updated part are combined to generate the temporary object, the file is re-split into a plurality of parts so that the transferred and updated data, which serves as an update-caused differential, and the not-transmitted data are handled as the parts different from the part containing the transmitted and not-updated data, and only the differential can be efficiently retransmitted.

Effects of the Invention

In a case of updating a transferred part, a storage system that splits a file into parts and that transfers the parts can efficiently retransmit data.

BRIEF DESCRIPTION OF THE DRAWINGS

FIGS. 5A and 5B are flowcharts of a differential upload process according to the first embodiment.

FIG. 10 is a diagram depicting an example of a replica state information table.

FIGS. 11A and 11B are flowcharts depicting a file transfer process in replication and migration according to the second embodiment.

MODES FOR CARRYING OUT THE INVENTION

Figure 1:
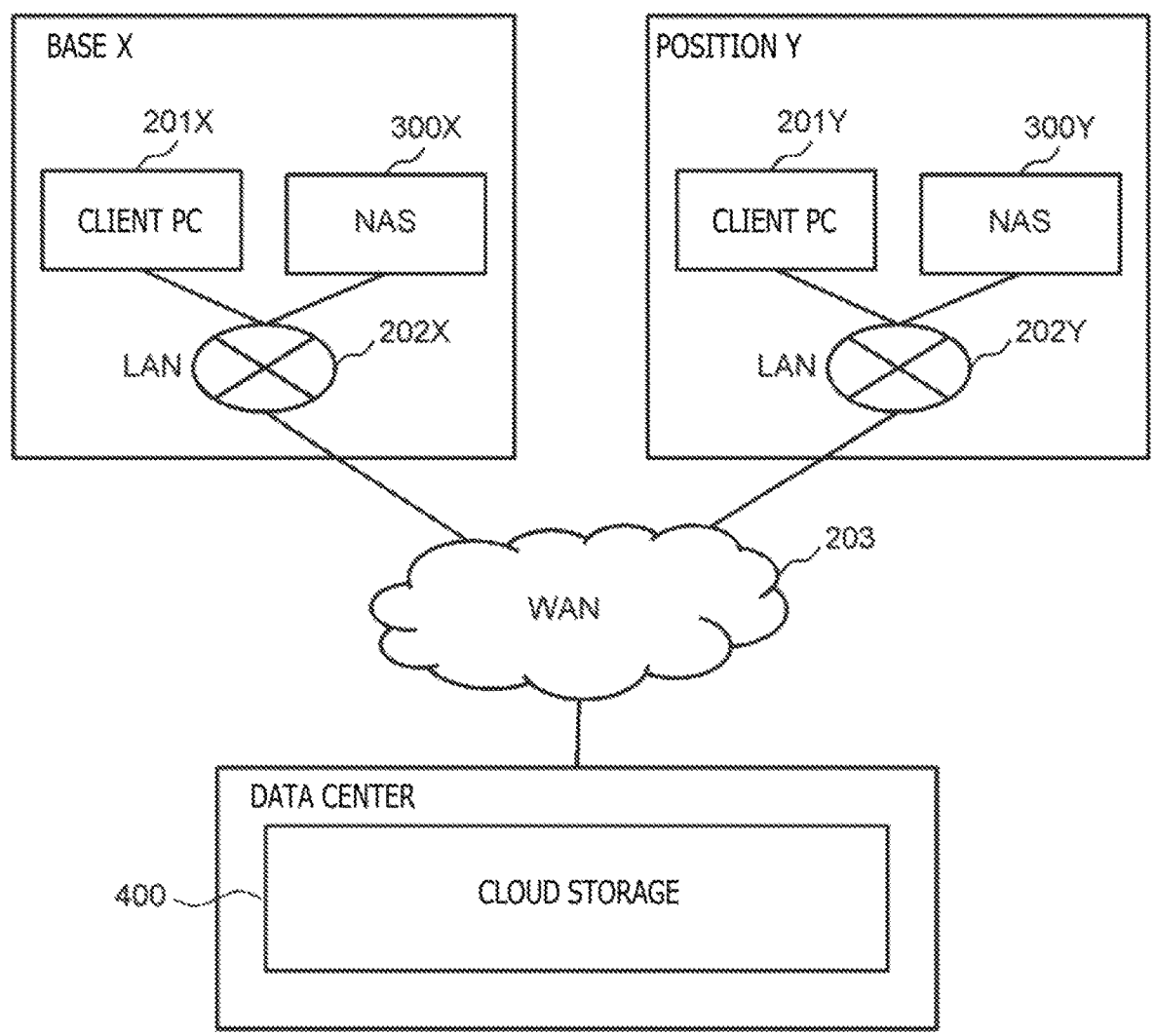
FIG. 1 is a block diagram depicting a schematic configuration of a computing machine system according to a first embodiment.

Embodiments of the present invention will be described hereinafter with reference to the accompanying drawings while taking a computing machine system that includes a NAS, a client PC, and a cloud storage by way of example. It should be noted, however, that the present embodiments are given as an example only for realizing the present invention and are not intended to limit the technical scope of the present invention. The cloud storage is an object storage located in a data center connected by the Internet.

In the following description, information is often described using an expression such as "xxx table"; however, the information may be expressed in any data structure. In other words, such information can be referred to as the other name such as "xxx table" or "xxx database." Furthermore, in the following description, a configuration of each information is given as an example, one information may be split into two or more pieces of information, and all of or part of two or more pieces of information may be one information.

Moreover, in the following description, an ID is used as identification information about an element; however, other types of identification information may be used as an alternative to or in addition to the ID.

Moreover, in the following description, in a case of describing elements of the same type without discrimination, common numbers are often used in reference characters for the elements, and in a case of describing the elements of the same type with discrimination, reference characters unique to the elements or IDs assigned to the elements as an alternative to the reference characters are often used.

Moreover, in the present embodiment, a process is often described with "program" set as a subject. However, since the program performs a specified process using storage resources (for example, a memory) and/or an interface device (for example, a communication port) as appropriate by being executed by a processor (for example, CPU (Central Processing Unit)), the subject of the process may be the processor. The process described with the program set as the subject may be a process performed by the processor, an apparatus having the processor, or by a system. Furthermore, the processor may include a hardware circuit that performs part or entirety of the process. The program may be installed into an apparatus such as a computing machine from a program source. The program source may be, for example, a program distribution server or a computing-machine-readable storage media. In a case in which the program source is the program distribution server, then the program distribution server may include a processor (for example, CPU) and storage resources, and the storage resources may further save a distribution program and a program to be distributed. Furthermore, the processor in the program distribution server may distribute the program to be distributed to the other computing machines by causing the processor in the program distribution server to execute the distribution program. Moreover, in the following description, two or more programs may be realized as one program or one program may be realized as two or more programs.

Furthermore, the embodiments of the present invention may be implemented as software that runs on a general-purpose computer or may be implemented as dedicated hardware or a combination of software and hardware, as described later.

In the embodiments of the present invention, a communication network used for a communication between a NAS and a cloud storage is not limited to a WAN (World Area Network) but may be the other communication network such as a LAN (Local Area Network).

Furthermore, in the following description, a file or a directory serving as a data management unit will be generically referred to as "object." In the following description, a process performed on the directory may be a process performed on the object. In other words, it is possible to execute a process on a file similarly to the process on the directory.

First Embodiment

FIG. 1 is a block diagram depicting a schematic configuration of a computing machine system according to the first embodiment.

The computing machine system of the present embodiment is disposed to be decentralized to at least one base and one data center, and the base and the data center are connected to each other via a WAN 203. While only two bases X and Y are depicted in FIG. 1, the number of bases is not limited to two.

Each base includes a client PC 201, the NAS 300, and a LAN 202.

The client PC 201 is a computing machine used by an end user for utilizing a file sharing service provided by the NAS 300. A client program or the like for communicating with the NAS 300 runs on the client PC 201. The client PC 201 issues a request, such as a request to create, delete, move, or rename a file or a directory, to read data, or to write data, to the NAS 300 on the basis of an end user's operation.

The LAN 202 is a communication network for mutually connecting the client PC 201 and the NAS 300.

The NAS 300 is a computing machine that provides the file sharing service to the end user. A detailed configuration of the NAS 300 will be described later.

The WAN 203 is the communication network that connects the LAN 202 at each base to the data center. The NAS 300 and a cloud storage 400 hold a communication with each other via this communication network. For this communication, a communication protocol, for example, an HTTP (Hypertext Transfer Protocol) or an HTTPS (Hypertext Transfer Protocol Secure) is used.

The data center has the cloud storage 400 for saving a file on a cloud. A detailed configuration of the cloud storage 400 will be described later. It is noted that the cloud storage 400 may adopt a cluster configuration with a plurality of nodes.

As depicted in FIG. 1, in the computing machine system of the first embodiment, the NAS 300 and the cloud storage 400 are connected to each other by the communication network, and data about files stored in the NAS 300 is transferred to the cloud storage 400. A file of a large size equal to or greater than a preset arbitrary size, among the files to be transferred, is transferred using the Multipart Upload API.

The Multipart Upload API is an API used to split a file into a plurality of parts and to transfer every file. At a time of transfer of data using this API, the NAS 300 transmits first a request to start a Multipart Upload transaction to the cloud storage 400.

When this start request is successful, the cloud storage 400 transmits an identifier of the transaction to be started to the NAS 300 as a response. The NAS 300 splits a file into parts, adds a header containing the identifier of the transaction and a part number indicating an order of parts to each of these parts and transfers each header-added part to the cloud storage 400. When successfully receiving the part, the cloud storage 400 transmits an ETAG (entity tag) of the transferred part data to the NAS 300 as a response. The ETAG is a hash value of the transferred data.

After transferring all the parts of the data about the file, the NAS 300 issues a combining request to the cloud storage 400. This combining request contains the identifier of the transaction, the part number and the ETAG of each of the transferred parts. Upon reception of the combining request, the cloud storage 400 combines the transferred parts into one object and ends the Multipart Upload transaction.

While the ETAG is described as the hash value of the data as an example, the ETAG may be a character string that enables the cloud storage 400 to identify the data as another example. Furthermore, while an example of transferring all the parts, into which the file is split, is illustrated herein, the data already stored in the cloud storage 400, that is, the data in the cloud storage 400 may be copied without transferring data from the NAS 300 as another example.

A case, for example, in which a file transferred from the NAS 300 to the cloud storage 400 on the first day is updated within the NAS 300 and the updated file is transferred again from the NAS 300 to the cloud storage 400 on the second day is supposed. In this case, data within the cloud storage 400 may be copied for a not-updated portion out of the data stored on the first day, an updated portion may be transferred from the NAS 300 to the cloud storage 400, and the copied data may be combined with the transferred data.

At a time of executing copying, the NAS 300 issues a copy request, which contains a transaction identifier, a part number of data to be copied, an object name in the cloud storage 400 as a copy source, and a copy range in an object, to the cloud storage 400. Upon reception of the copy request, the cloud storage 400 transmits the ETAG to the NAS 300 as a response.

Figure 2:
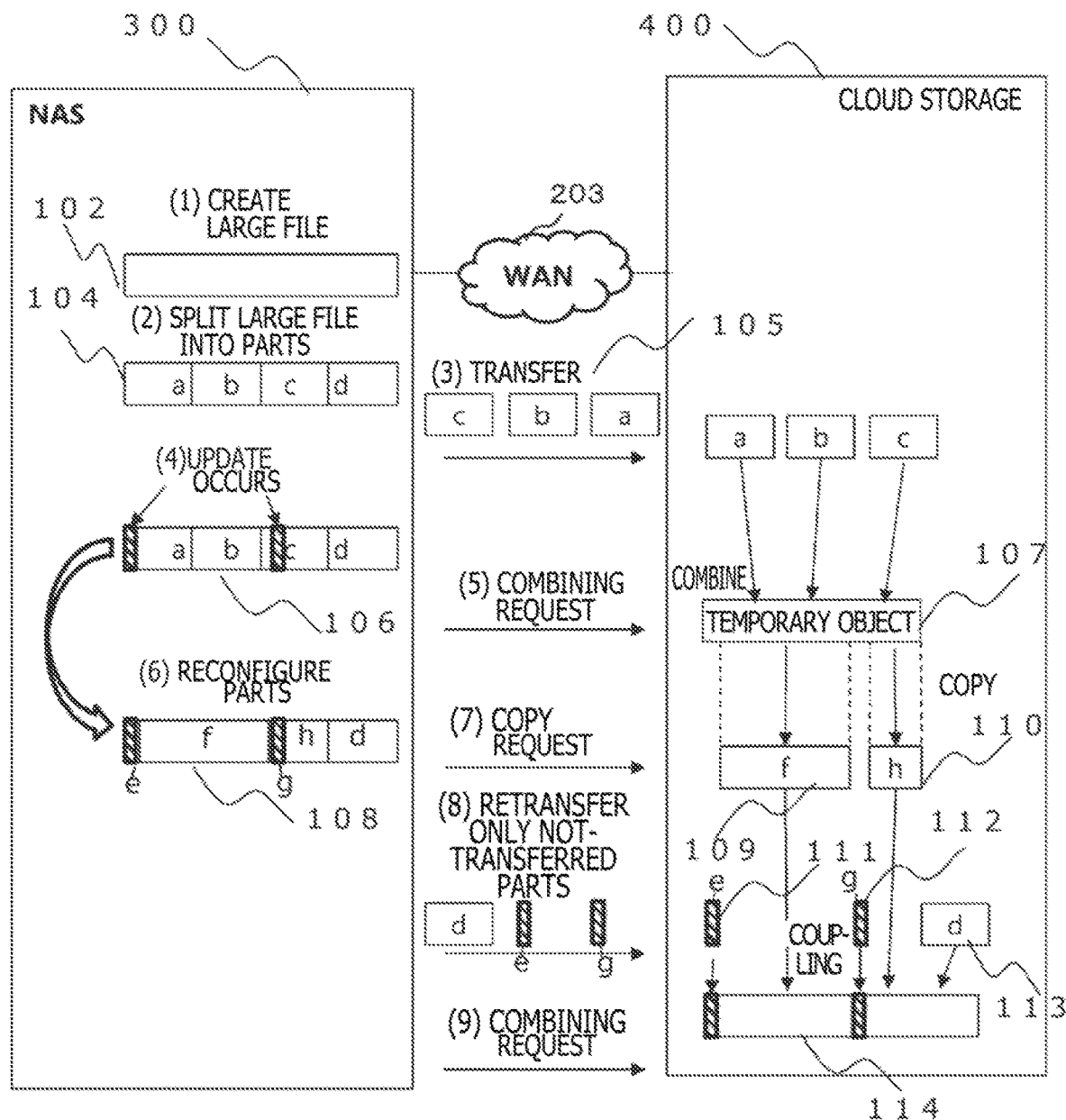
FIG. 2 is a diagram for illustrating an outline of processes performed by the computing machine system according to the first embodiment.

FIG. 2 is a diagram for illustrating an outline of processes performed by the computing machine system according to the first embodiment. An action of uploading a large-sized file (hereinafter, referred to as "large file") stored in the NAS 300 to the cloud storage 400 connected to the NAS 300 via the WAN 203 will be described with reference to FIG. 2. The NAS 300 uploads a large file 102 to the cloud storage 400 using the Multipart Upload API.

At a time of uploading the large file 102 using the Multipart Upload API, the NAS 300 splits first the large file 102 into a plurality of parts and creates a large file 104 split into the plurality of parts. The NAS 300 then sequentially transfers the plurality of parts to the cloud storage (Step 105).

It is assumed that part a, part b, and part c are completed with transfer out of the parts that are being transferred (Step 105), and that the file that is being uploaded is updated while part d is in a not-transferred state. A file in an updated state is a large file 106. Hatched portions in the file depicted in FIG. 2 are updated portions. The parts a and c contain the updated portions.

It is assumed that the "file that is being uploaded" refers to not only a file for which a part that is a portion of the file is being transferred but also a file in a state since a Multipart Upload start request is issued until a combining request is issued for the file. For example, a file that is updated in a period in which an upload process is temporarily halted and parts are not transferred is also in a state in which the "file that is being uploaded" is updated.

The NAS 300 transmits a combining request to combine the plurality of parts containing the updated parts and to create a temporarily generated object (hereinafter, referred to as "temporary object") 107, to the cloud storage 400. In this example, the cloud storage 400 is requested to combine the parts a, b, and c, and creates the temporary object 107 by combining those parts.

In this way, creating the temporary object 107 by integrating the already-transferred parts into one object leads to an end of a Multipart Upload session for a time; thus, at a time of starting a new Multipart Upload session, it is possible to arbitrarily determine a part configuration as to how to split a file into parts.

Furthermore, the NAS 300 splits a file into a plurality of parts using the Multipart Upload API and uploads the parts to the cloud storage 400.

At this time, the NAS 300 splits the file stored in the NAS 300 into the plurality of parts in the following manner and transfers the parts to the cloud storage 400.

In a case in which the file already uploaded to the cloud storage 400 is updated, then updated portions and not-updated portions are handled as different parts, and only the updated portions are transferred, data is copied from portions corresponding to the not-updated portions on an object which is uploaded before update and stored in the cloud storage 400 for the not-updated portions, and parts are created.

Furthermore, in a case in which a not-transferred portion is present, the part configuration of a file is determined in such a manner that the not-transferred portion is handled as a different part from the not-updated portions. In an example of FIG. 2, the part d is the not-transferred portion.

The NAS 300 designates the portions that are already transferred and not updated in the temporary object 107, and issues a copy request to clip the portions from the temporary object 107. The NAS 300 issues the copy request to request the cloud storage 400 to copy parts 109 and 110.

Furthermore, parts to be split from the file are reconfigured within the NAS 300 so that the updated portions and the not-updated portions are handled as different parts. The file in which the parts to be split are reconfigured is a large file 108.

The NAS 300 extracts the updated portions from the part-reconfigured large file 108 and transfers the updated portions to the cloud storage 400. In a case in which a not-transferred part is present at this time, the NAS 300 also transfers the part to the cloud storage 400. In the example of FIG. 2, the NAS 300 transfers updated parts e and g and the not-transferred part d to the cloud storage 400.

Finally, the NAS 300 issues a request to combine the part 109 (part f) and the part 110 (part h) that are copied, a part 111 (part e) and a part 112 (part g) that are updated, and a part 113 (part d) that is additionally transferred, to the cloud storage 400 to complete an object 114 in the cloud storage 400.

Different object names are assigned to the object 114 obtained by finally combining the parts and the temporary object 107. Alternatively, in a case in which the temporary object 107 has the same object name as that of the object 114, different versions may be assigned to the object 114 and the temporary object 107.

The version is a function that causes, when the other object is uploaded with the same object name as that of an object already present in the cloud storage 400 so that the other object can overwrite the object already present therein, data before overwrite to be stored as a previous version and to be accessible, and the version is provided in the cloud storage 400.

The version function enables the end user to acquire a list of versions assigned to an object, or to designate an arbitrary version number to acquire data about an arbitrary version. Moreover, in the copy request, it is possible to designate an arbitrary version as the copy source.

Furthermore, in the present embodiment, the NAS 300 exercises control in such a manner that the temporary object is invisible to a client PC.

Figure 3A:
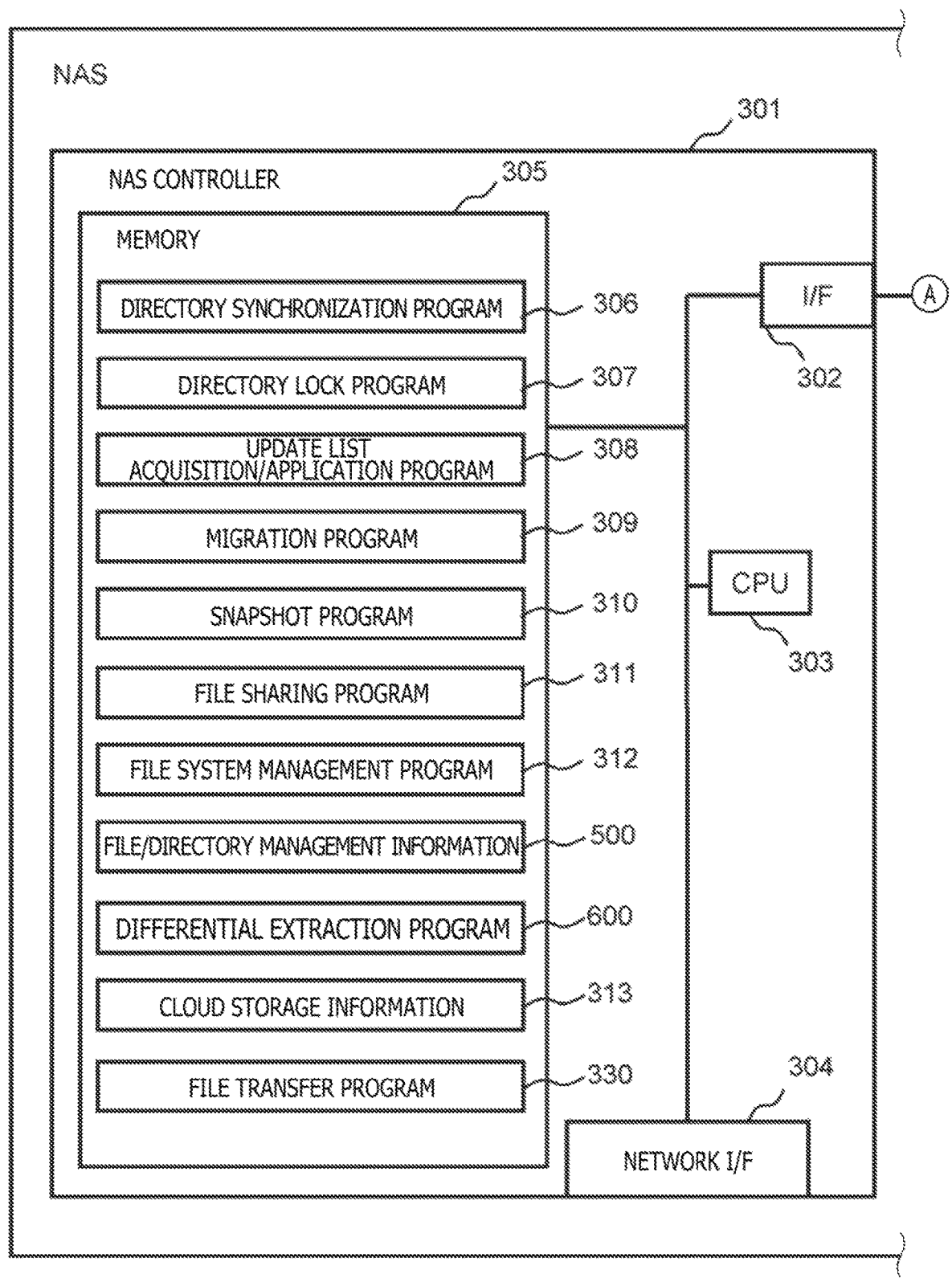
FIGS. 3A and 3B are block diagrams depicting a configuration of a NAS 300.
Figure 3B:
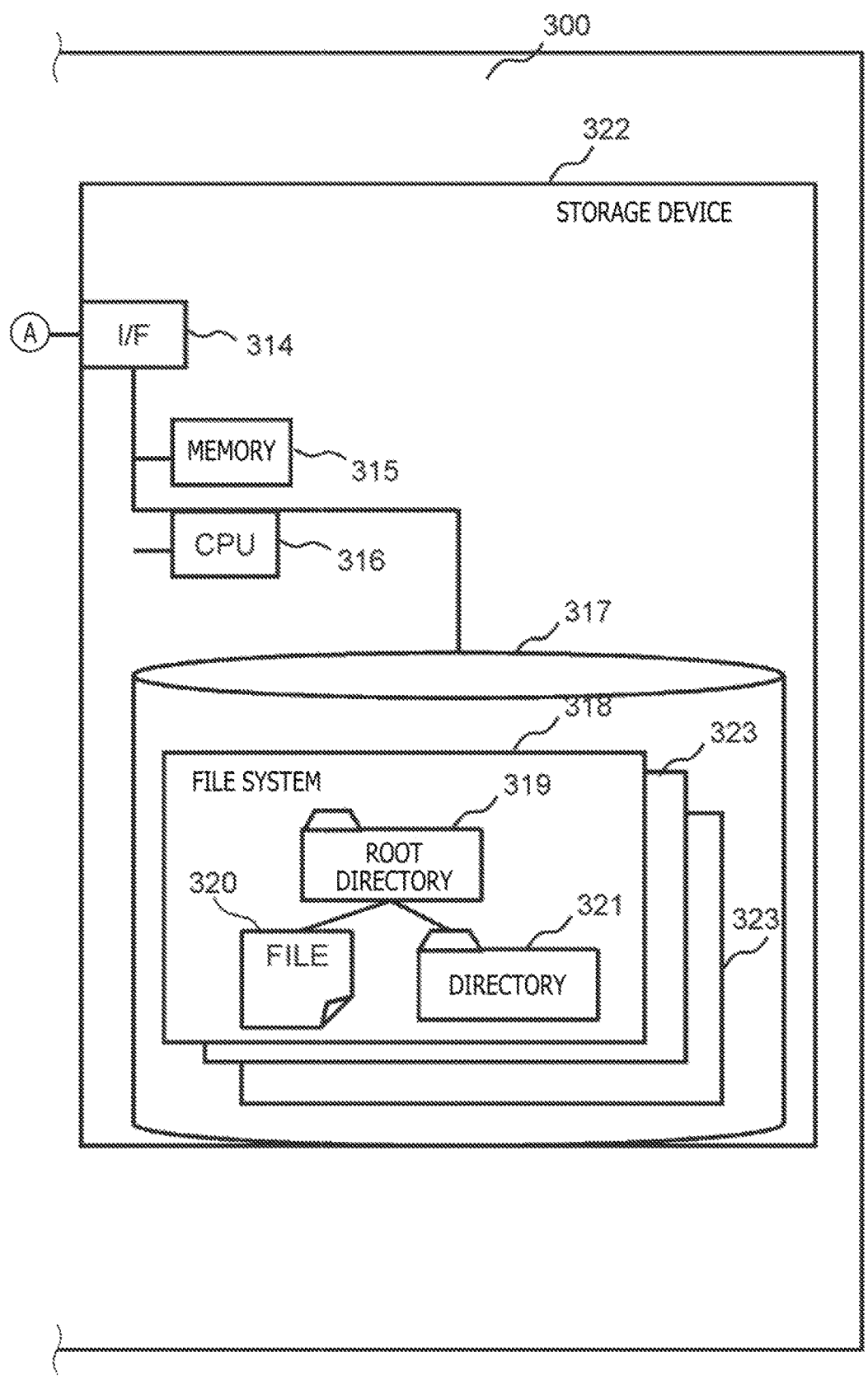

FIGS. 3A and 3B are block diagrams depicting the configuration of the NAS 300.

The NAS 300 includes a NAS controller 301 and a storage device 322.

The NAS controller 301 includes an I/F (Interface) 302, a CPU 303, a network I/F 304, and a memory 305. The sections in the NAS controller 301 are connected to one another by an internal channel (for example, bus).

The I/F 302 is utilized to connect the NAS controller 301 to the storage device 322, and the NAS controller 301 reads and writes data from and to the storage device 322 via the I/F 302.

The CPU 303 executes processes for reading and writing data from and to the storage device 322 in accordance with programs and data within the memory 305.

The network I/F 304 is connected to the client PC 201 and the cloud storage 400 via the LAN or WAN and communicates with the client PC 201 and the cloud storage 400.

The memory 305 stores the programs and data for control of the NAS 300. The memory 305 stores a directory synchronization program 306, a directory lock program 307, an update list acquisition/application program 308, a migration program 309, a snapshot program 310, a file sharing program 311, a file system management program 312, file/directory management information 500, a differential extraction program 600, cloud storage information 313, and a file transfer program 330.

The directory synchronization program 306 is a program for synchronizing a directory to which a synchronization requirement flag is set with a directory in the cloud storage 400 when the end user accesses the former directory.

The directory lock program 307 is a program for acquiring and releasing a directory lock in the cloud storage 400. The directory lock program 307 includes a directory lock process and a directory lock release process.

In the directory lock process, the directory lock program 307 acquires a directory lock on a directory designated by an ID that serves as an argument from the cloud storage 400 using the object ID designated by an argument as the argument. In the directory lock release process, the directory lock program 307 releases the directory lock on the directory designated by the argument by requesting the cloud storage 400 to execute a directory unlock process using the object ID designated by the argument as the argument.

The update list acquisition/application program 308 acquires an update list from the cloud storage 400 and sets the synchronization requirement flag to an object for which a path is described in the acquired update list.

The migration program 309 includes a migration process. In the migration process, the migration program 309 requests the cloud storage 400 to save an object, thereby causing a file or a directory updated in a file system 318 in the NAS 300 to be saved in the cloud storage 400, and also requests the cloud storage 400 to save an object for the update list in which a path name of the file or the directory is described, thereby causing this update list to be saved in the cloud storage 400. It is noted that in the migration process, a file or a directory in the cloud storage 400 is deleted for a file or a directory which has been deleted in the file system 318.

The snapshot program 310 is a program for storing a state of data at arbitrary timing in the file system 318 within a disk 317 and providing an access to the data in the stored state in the file system 318. Furthermore, the snapshot program 310 can store a plurality of states, and provides a function of comparing two different states and outputting a difference in the data.

The snapshot program 310 does not necessarily store the state of data within the disk 317 for each file system 318 and may store the state of the data in, for example, units called partitions or volumes into which a block space within the disk 317 is delimited.

The snapshot program 310 stores difference information between snapshots or between the file systems 318 in an area within the disk 317 for storing the states.

A snapshot 323 is created by the snapshot program 310 so that a state of data at arbitrary time in the file system 318 or the like can be held and the data can be reproduced. The snapshot 323 is disposed in an area, for example, a volume, provided within the disk 317, and is configured with a data differential between the latest file system 318 and the file system 318 at arbitrary timing and data differential management data, and data can be reproduced by the snapshot program 310 equivalently with the file system.

The file sharing program 311 is a program for providing the end user with a file sharing service by defining part or entirety of the file system 318 as "shared" and making the part or entirety thereof public to the client PC 201. In the file sharing service, the NAS 300 communicates with the client PC using a protocol, for example, a CIFS (Common Internet File System) or an NFS (Network File System) protocol.

The file system management program 312 is a program for managing the file system 318 stored in the disk 317 within the storage device 322. The NAS 300 uses the file system management program 312 to operate a root directory 319, a file 320, and a directory 321 created in the file system 318. In other words, the other programs stored in the memory 305 invoke the file system management program 312 to operate the root directory 319, the file 320, and the directory 321 created in the file system 318. It is noted that the root directory is a nominal designation of a topmost directory in a hierarchized directory structure.

The differential extraction program 600 is a program that extracts updated differential portions between timing of previously transferring the file 320 to the cloud storage 400 and either timing of executing the program or timing of acquiring the snapshot, and outputs all updated portions in the file.

The differential extraction program 600 performs differential extraction in cooperation with the snapshot program 310. The snapshot program 310 acquires a snapshot before transferring a file from the NAS 300 to the cloud storage 400 and saves a state of the file system 318. The NAS 300 reads the file of the acquired and saved snapshot and transfers the file to the cloud storage 400. A plurality of generations of snapshots are saved.

The differential extraction program 600 acquires an updated differential between a snapshot of the file 320 to be transferred before the file is previously transferred and the latest snapshot, and extracts a differential from the previous transfer of the file 320.

As a method of transferring the file 320, updated files 320 may be collectively transferred in a case in which a plurality of files 320 are present in the file system 318. In that case, the differential extraction program 600 acquires a snapshot, extracts a differential between the snapshot and the previously transferred snapshot, and extracts a differential per updated file 320. The differential extraction program 600 transfers only updated portions in each file 320 to the cloud storage 400 on the basis of a difference extraction result of the file 320. At the time of transfer, the differential extraction program 600 reads the updated file 320 in the snapshot.

The cloud storage information 313 is information for allowing the NAS 300 to communicate with the cloud storage 400. For example, the cloud storage information 313 is information about an URL (Uniform Resource Locator) and a protocol used for communication. The cloud storage information 313 may be information related to a plurality of cloud storages 400. Furthermore, the cloud storage information 313 may be stored in the disk 317.

The file transfer program 330 performs a NAS 300-side processes in the file transfer depicted in FIG. 2 in cooperation with the other programs.

The storage device 322 includes an I/F 314, a memory 315, a CPU 316, and the disk 317. The sections in the storage device 322 are connected to one another by an internal channel (for example, bus).

The I/F 314 is connected to the NAS controller 301 and communicates with the NAS controller 301.

The memory 315 stores programs and data for control of the storage device 322.

The CPU 316 performs write and read processes and the like on the disk 317 in accordance with the programs and the data in the memory 315.

The disk 317 is a nonvolatile storage medium such as an HDD (Hard Disk Drive) or an SSD (Solid State Drive). The file system 318 managed by the file system management program 312 is constructed in the disk 317. The disk 317 thereby stores directories and files. The disk 317 may be a plurality of disks.

The file system 318 is managed by the file system management program 312, and stores the file 320 and the directory 321 created/updated by the end user. The file system 318 has a hierarchical structure with the root directory 319 as a topmost directory. In other words, a plurality of directories can be further created under the directory. The file system 318 may be a plurality of file systems.

It is noted that the NAS controller 301 is often referred to as "controller." In addition, the disk 317 is often referred to as "storage device."

Figure 4A:
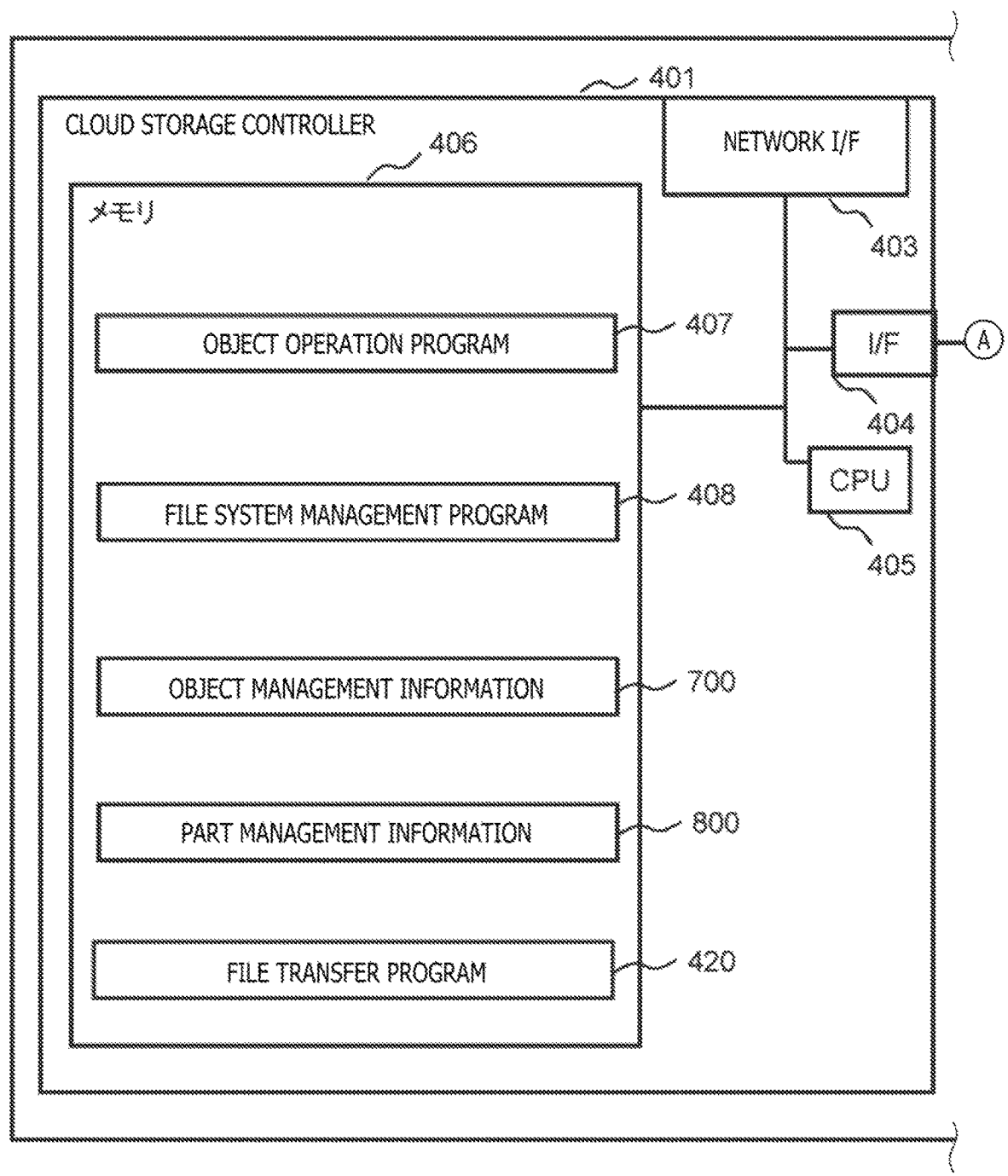
FIGS. 4A and 4B are block diagrams depicting a configuration of a cloud storage 400.
Figure 4B:
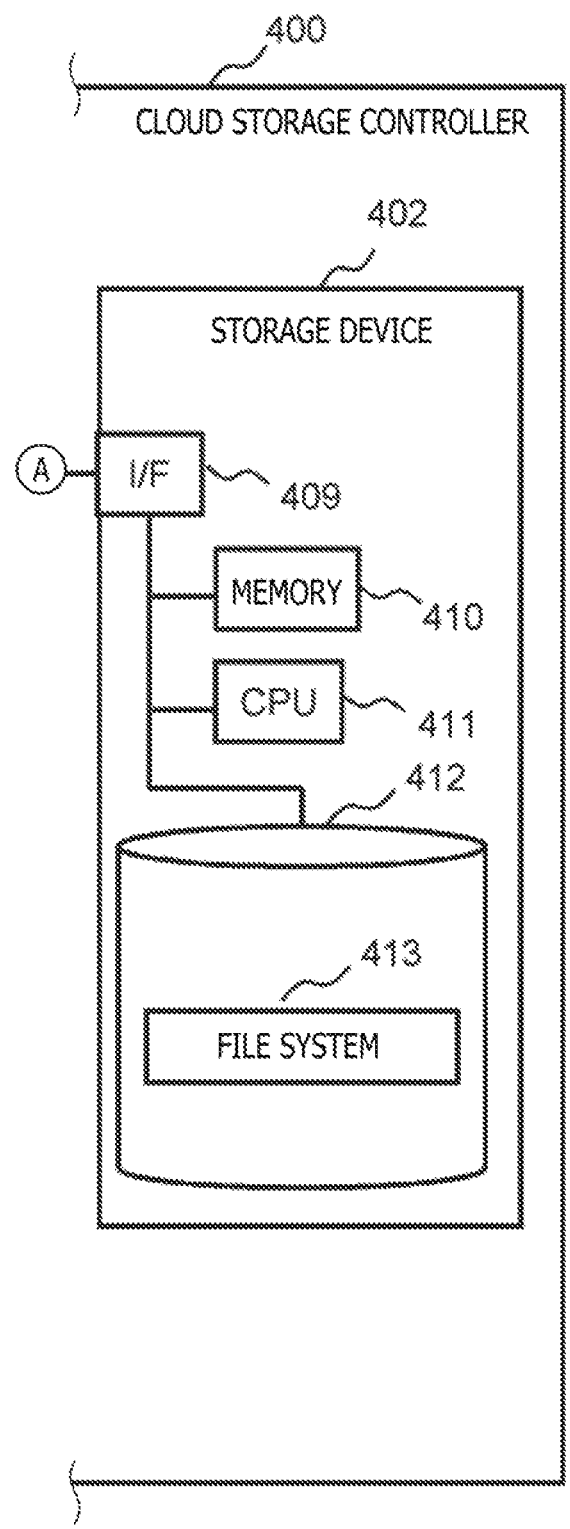

FIGS. 4A and 4B re block diagrams depicting the configuration of the cloud storage 400.

The cloud storage 400 includes a cloud storage controller 401 and a storage device 402.

The cloud storage controller 401 includes a network I/F 403, an I/F (Interface) 404, a CPU 405, and a memory 406. The sections in the cloud storage controller 401 are connected to one another by an internal channel (for example, bus).

The network I/F 403 is connected to the NAS 300 via the WAN and used for a communication with the NAS 300.

The I/F 404 is utilized to connect the cloud storage controller 401 to the storage device 402. The cloud storage controller 401 reads and writes data from and to the storage device 402 via the I/F 404.

The CPU 405 executes processes of an object operation program 407 and a file system management program 408 in accordance with programs and data within the memory.

The memory 406 stores the programs and the data for control of the cloud storage 400. The memory 406 includes the object operation program 407, the file system management program 408, object management information 700, part management information 800, and a file transfer program 420.

The object operation program 407 executes processes such as reading and writing of files and directories stored in a file system 413, acquisition of a version list, locking, unlocking, locking confirmation, and locking time acquisition in accordance with requests from the NAS 300, and transmits results to the NAS 300 as a response.

The file system management program 408 is a program that manages the file system 413. The file system management program 408 reads and writes objects stored in the file system 413 on the basis of a request from the object operation program 407.

The object management information 700 is information for managing the files and directories saved in the file system 413 in response to requests from the NAS 300. Details of an example of a data configuration of the object management information 700 will be described later. It is noted that the object management information 700 may be stored in a disk 412.

The part management information 800 is information for managing the parts transferred from the NAS 300 or those copied from portions of existing objects within the cloud storage 400. A session ID, a storage destination object name, a part number, a part ETAG value, and a storage destination of the data are recorded in the part management information 800 per Multipart Upload session. It is noted that the part management information 800 may be stored in the disk 412.

The ETAG is information corresponding to data about a part such as a hash value of data in a case in which the ETAG is an ETAG of an uploaded part and a copy management number in a case in which the ETAG is an ETAG of a copied part. The session ID is an ID issued by the cloud storage 400 at a time of starting a Multipart Upload session and identifying the session.

The file transfer program 420 performs a cloud storage 400-side processes in the file transfer depicted in FIG. 2 in cooperation with the other programs.

The storage device 402 includes an I/F 409, a memory 410, a CPU 411, and the disk 412. The sections in the storage device 402 are connected to one another by an internal channel (for example, bus).

The I/F 409 is connected to the cloud storage controller 401 and communicates with the cloud storage controller 401.

The memory 410 stores programs and data for control of the storage device 322.

The CPU 411 performs write and read processes and the like on the disk 412 in accordance with the programs and the data in the memory 410.

The disk 412 is a nonvolatile storage medium such as an HDD (Hard Disk Drive) or an SSD (Solid State Drive). The file system 413 managed by the file system management program 408 is constructed in the disk 412. The disk 412 thereby stores directories and files. The disk 412 may be a plurality of disks.

The file system 413 is managed by the file system management program 408. The files and the directories are stored in the file system 413 in response to requests from the NAS 300. It is noted that the file system 413 may be a plurality of file systems.

An outline of the computing machine system according to the present embodiment will now be laid out.

In the computing machine system (hereinafter, often referred to as "storage system") according to the present embodiment, the NAS 300 is a file storage that manages a file and that transfers the file to an object storage. The cloud storage 400 is the object storage that stores the file transferred from the file storage that manages the file. The NAS 300 has the network interface 304 (network interface section) that transmits and receives data through the communication network, the file system management program 312 (file system management section) that manages the file, and the file transfer program 330 (file transfer section) that splits the file into a plurality of parts to which serial numbers are assigned and that transmits the plurality of parts to the object storage. Furthermore, the cloud storage 400 has the network interface 403 (network interface section) that transmits and receives data through the communication network, the file system management program 408 (file system management section) that manages the file, and the file transfer program 420 (file transfer section) that receives the plurality of parts, into which the file is split by the file storage and to which the serial numbers are assigned, from the file storage.

The file transfer program 330 requests the cloud storage 400, when the part already transmitted to the cloud storage 400 is updated by the file system management program 312, to generate the temporary object containing the transmitted and updated part by combining the parts transmitted before update, via the network interface 304. Furthermore, the file transfer program 330 re-splits the file into a plurality of parts so that transmitted and updated data and not-transmitted data are handled as parts different from the part containing transmitted and not-updated data. At this time, a not-updated data section that adjoins an updated data or not-transmitted data section and that has a capacity lower than a preset capacity may be re-split into parts that are the same as the part containing the updated data and the part containing the not-transmitted data. Furthermore, the file transfer program 330 transmits the part containing the transmitted and updated data or the not-transmitted data to the cloud storage 400.

On the other hand, when the part received from the NAS 300 is updated in the NAS 300, the file transfer program 420 in the cloud storage 400 receives the request from the NAS 300 via the network interface 403 to create the temporary object containing the transmitted and updated part. The file transfer program 420 creates the temporary object in response to an instruction from the NAS 300. Furthermore, the file transfer program 420 receives the part containing the transmitted and updated data or not-transmitted data among the plurality of parts into which the temporary object is re-split in the NAS 300 and to which the serial numbers are assigned so that the part containing the transmitted and updated data and the part containing the not-transmitted data are handled as the parts different from the parts containing the transmitted and not-updated data, from the NAS 300.

In this way, according to the first embodiment, when the storage system, which splits a file into parts and that transfers the parts, updates the part transmitted to the cloud storage 400, then the temporary object is generated by combining a plurality of parts including the updated part, the file is re-split so that the transmitted and updated data and the non-transmitted data are handled as the parts different from the part containing the transferred and not-updated data, and only the part containing the updated data and the part containing the non-transmitted data are retransmitted; thus, it is possible to efficiently retransmit data in a case of updating an already transferred large part.

It is noted that the file transfer program 330 in the NAS 300 requests the cloud storage 400, when the part transmitted to the cloud storage 400 is updated by the file system management program 312, to create the temporary object by combining a plurality of parts transferred before the update and including the updated part. The file transfer program 420 in the cloud storage 400 creates the temporary object in accordance with the request.

Furthermore, more specifically, the file transfer program 330 in the NAS 300 splits the file into the plurality of parts to which the serial numbers are assigned, transmits the plurality of parts to the cloud storage 400, and requests the cloud storage 400 to combine the plurality of parts in accordance with the serial numbers. Moreover, the file transfer program 330 requests the cloud storage 400, when the part transmitted to the cloud storage 400 is updated by the file system management program 312, to create the temporary object containing the updated part. The file transfer program 420 in the cloud storage 400 creates the temporary object in response to this request. Moreover, the file transfer program 330 in the NAS 300 re-split the file into the plurality of parts to which the serial numbers are assigned so that the part containing the transferred and updated data and the part containing the not-transmitted data are handled as the parts different from the parts containing the transferred and not-updated data, and transmits the part containing the transferred and updated data and the part containing the not-transmitted data to the cloud storage 400. The file transfer program 420 in the cloud storage 400 receives the part containing the transferred and updated data and the part containing the not-transmitted data. The file transfer program 330 in the NAS 300 then requests the cloud storage 400 to duplicate the parts containing the transferred and not-updated data from the temporary object, and requests the cloud storage 400 to combine the part containing the transferred and updated data and the part containing the non-transmitted data with the parts containing the transferred and not-updated data in accordance with the serial numbers. The file transfer program 420 in the cloud storage 400 creates a file object by combining the part containing the transferred, updated data and the part containing the not-transmitted data, and the parts containing the transferred and not-updated data in accordance with the serial numbers, in response to the request. In this way, according to the present embodiment, the file for which parts to be split are newly reconfigured is split into the parts to which the serial numbers are assigned and the parts are put together in the object storage; thus, it is possible to efficiently and reliably create a reconfigured file.

Moreover, according to the present embodiment, more specifically, the file transfer program 330 in the NAS 300 re-splits the temporary object into a plurality of parts to which the serial numbers are assigned so that the transferred and updated data, the transferred and not-updated data, and the not-transmitted data are handled as parts different from one another, transmits a first part containing the updated data and a second part containing the non-transmitted data to the cloud storage 400, requests the cloud storage 400 to duplicate a third part containing the not-updated data from the temporary object, and requests the cloud storage 400 to combine the first part, the second part, and the third part in accordance with the serial numbers. The file transfer program 420 in the cloud storage 400 receives the first part and the second part, duplicates the third part from the temporary object, and combines the first part, the second part, and the third part in accordance with the serial numbers. The updated data, the not-transmitted data, and the not-updated data are handled different from one another, only the updated data and the not-transmitted data are transmitted to the cloud storage 400, and the cloud storage 400 combines the updated data and the not-transmitted data with the part containing the not-updated data; thus, it is possible to efficiently and reliably create a reconfigured file.

Processes performed by the computing machine system of the present embodiment will be described hereinafter in detail.

Figure 5B:
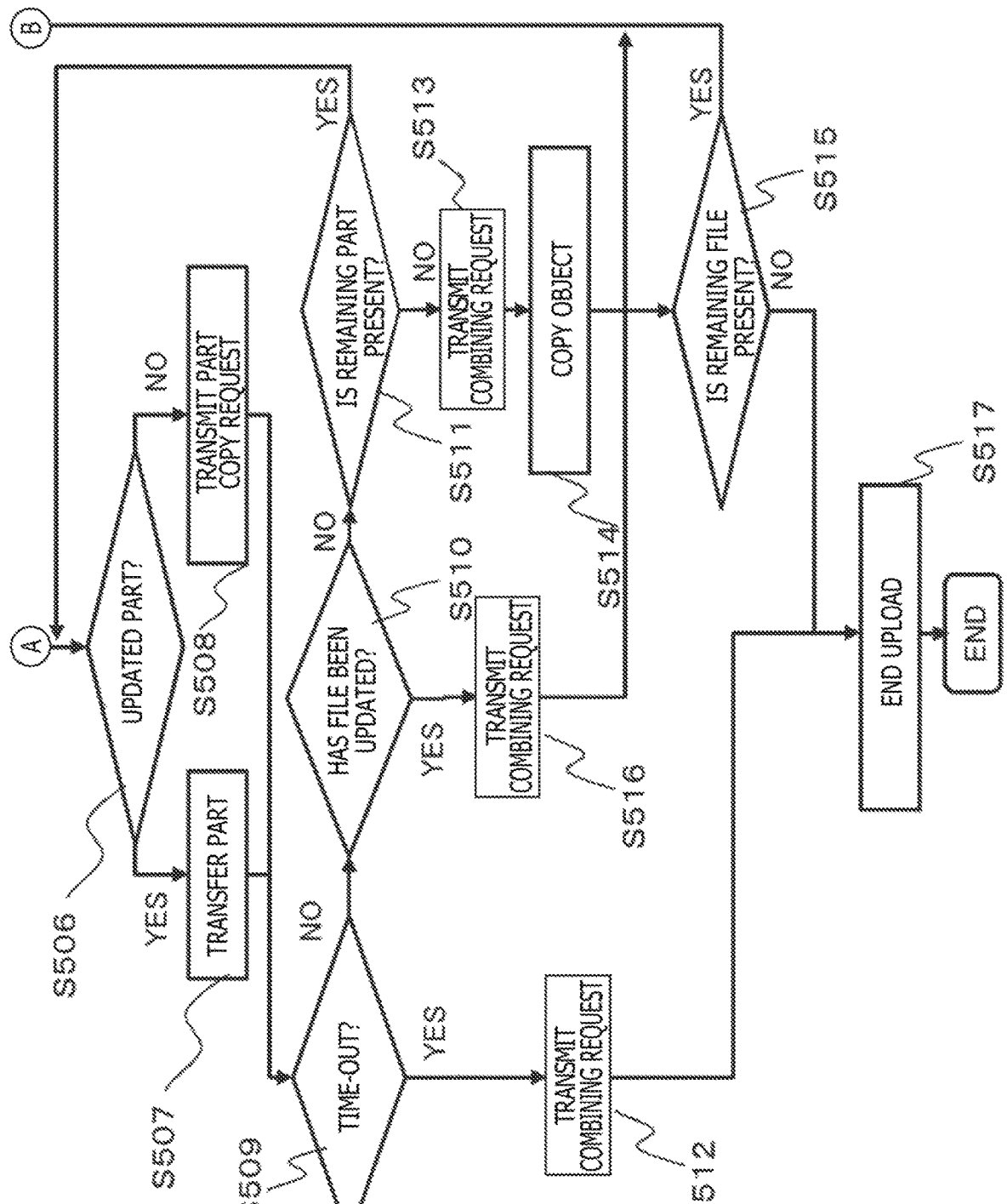

FIGS. 5A and 5B are flowcharts of a differential upload process according to the first embodiment. S500 is a step of starting upload, and the migration program 309 in the NAS 300 is invoked.

S501 is a step of acquiring a snapshot, and is a process in which the snapshot program 310 saves a data state of the file system 318 at timing of the present process and creates a snapshot 323.

A loop process started in next S502 and exited in S517 is a process sequentially executed on each one of the files updated after the differential upload process of FIGS. 5A and 5B is previously executed. The update of a file includes herein newly creating a file, updating data about a file, adding data to a file, updating attributes of a file, adding an attribute to a file, changing a file name, changing a path of a file, deleting a path of a file, and the like. The file selected as an object subjected to the loop process among the updated files will be referred to as "file to be processed."

S502 is a step of a differential extraction process, and the differential extraction process is a process by the differential extraction program 600 for extracting a differential between the snapshot acquired in S501 and a snapshot acquired in the previous differential upload process, and extracting a differential of the file to be processed from the extracted differential. In the process for extracting the differential of the file to be processed from the differential between the snapshots, the differential extraction program 600 acquires file information related to a portion corresponding to the differential of the file to be processed out of data about the extracted differential between the snapshots, and acquires update position information in the file. As the file information, file allocation information that defines allocation of a storage area to the file, for example, can be utilized.

S504 is a step of a file splitting process, and the file splitting process is a process for splitting the file 320 into a plurality of parts on the basis of differential information indicating the differential of the file to be processed. The file 320 is split into the plurality of parts on the basis of the differential information about the file to be processed that is the file 320 so that an updated data portion and a not-updated data portion are handled as different parts. Part splitting is determined herein such that an arbitrary upper limit is provided on a size of each part, and in a case in which continuous portions at a large size in the file are updated, the updated portions are split into a plurality of parts. For example, in a case in which the part upper limit size is 20 MB, and in which the size of the updated continuous portions is 115 MB, the continuous updated portions are split into six parts that are a part at a size of 20 MB, a part at a size of 20 MB, a part at a size of 20 MB, a part at a size of 20 MB, a part at a size of 20 MB, and a part at a size of 15 MB.

Splitting the file into the plurality of parts as described above makes it possible to restrain data necessary to retransmit within the predetermined upper limit size even if a communication error occurs while any of the parts is being transferred due to a problem with the communication network. Furthermore, increasing the upper limit size to be equal to or larger than a certain size enables improvement in transfer efficiency of the communication network.

Moreover, if a size of continuous not-updated portions is large, the portions are split into a plurality of parts using a preset upper limit size in the cloud storage 400. For example, assuming that the upper limit size is 5 GB, the continuous not-updated portions at 6 GB are split into two parts that are a part at 5 GB and a part at 1 GB. By splitting the portions in this way, it is possible to grasp the part upper limit size in a design phase of the cloud storage 400; thus, it is possible to grasp size information such as a data size of parts and disk storage position information stored in the part management information 800 and to facilitate designing.

S505 is a step of a process for issuing a start request, in which the NAS 300 transmits a start request to start a Multipart Upload session to the cloud storage 400. At this time, the NAS 300 assigns, to the temporary object, a name different from an object name assigned to the file to be processed when the file to be processed is stored in the cloud storage 400 upon final completion of the differential upload. Upon reception of the start request, the cloud storage 400 transmits a session ID in response to the start request.

A loop process started in S506 and exited in S509, S510, or S511 is a process for processing each one of the parts created by splitting the file to be processed in S504. The part subjected to the loop process will be referred to as "part to be processed" hereinafter.

S506 is a step of a process for determining whether the part to be processed is an updated part or a not-updated part, and the process goes to S507 in a case in which the part to be processed is the updated part. Otherwise, the process goes to S508.

S507 is a step of a part transfer process, in which the part to be processed is uploaded to the cloud storage 400 using part upload by the Multipart Upload API. In S507, the migration program 309 reads data about the part from the snapshot 323 acquired in S501 and transfers the data about the part to the cloud storage 400 via the network I/F 304. In transferring the data about the part, the session ID is transmitted from the NAS 300 to the cloud storage 400 at a time of a transfer request, and the uploaded part is stored in the cloud storage 400 as a part in the Multipart Upload session with the session ID. At this time, the NAS 300 transmits the session ID, the part number, and part data to the cloud storage 400, while the cloud storage 400 transmits the ETAG to the NAS 300 as a response.

S508 is a step of a process for requesting a part copy, and the process is a process in which the NAS 300 requests the cloud storage 400 to generate the part in the Multipart Upload session by copying data about part of the object uploaded in the previous differential upload process from the uploaded object to the cloud storage 400. In the part copy request process, the NAS 300 transmits the session ID, the part number, copy source information, and copy range information to the cloud storage 400, while the cloud storage 400 transmits the ETAG to the NAS 300 as a response.

S509 is a step of a process for determining whether time-out occurs to the differential upload process, and the process is a process for determining whether elapsed time since start of the differential upload process exceeds predetermined upper limit time. The process goes to S512 when the elapsed time exceeds the upper limit time, and goes to S510 when the elapsed time does not exceed the upper limit time.

S510 is a step of a process for determining whether the file has been updated during upload, and the process goes to S516 in a case in which the file to be processed has been updated during upload. The process goes to S511 in a case in which the file to be processed has not been updated.

S511 is a step of a process for determining whether a remaining part is present, in which it is determined whether a remaining part that is not subjected to the process in response to the request of transfer or copy of the file to be processed is present, and the process goes to S506 in a case in which the remaining part is present and goes to S513 in a case in which the remaining part is not present.

S512, S513, and S516 are steps of a process for requesting combining, in each of which the NAS 300 requests the cloud storage 400 to combine the parts acquired in response to the part transfer in S507 or the part copy request in S508 within the cloud storage 400. In this request, the NAS 300 transfers the session ID, and information about sets of the part numbers and ETAGs of all the parts processed in S507 and S508 in the file to be processed to the cloud storage 400. In addition, the processed portions are rewritten to not-updated portions in the differential information about the file to be processed stored in the disk. An object having a different name is created in the cloud storage 400 by combining the parts.

In a case of time-out in S512, the temporary object created by the process before the time-out remains in the cloud storage 400. Owing to this, in the part copy request 508 on a next occasion of the differential upload process, the part that is the not-updated portion is copied from the temporary object.

Furthermore, in a case in which file update occurs in S510, the parts transferred so far are combined to create the temporary object in S516. It is thereby possible to start over the process from S502 for the updated portions in the file with respect to the sizes of the parts determined in S504. Creating the temporary object in S516 makes it possible to change the size of each part configured in S504 in response to the updated portions in the file. In other words, parts into which the file to be processed is split are reconfigured when the file to be processed reaches S504 through S516.

If the process in S516 is not performed, the sizes of the already processed parts cannot be changed. In addition, in a case in which file update occurs during the upload for the processed parts, it is necessary to retransmit all data about any of the parts from the NAS 300 to the cloud storage 400 even if an updated portion is a portion of the part, which results in an increase in a data volume to be transferred.

Details of changing the part sizes in response to the updated portion in the file will be described later.

S514 is a step of an object copy process, in which when the upload of the differential is completed, object data is copied from the object (temporary object) with an alias to a normal object to which a real name is assigned. The copy process is started when the NAS 300 issues an object copy request to the cloud storage 400. An upper limit size of data to be copied may be set in advance, and the cloud storage 400 may copy the object using the Multipart Upload API in a case in which the size of the object to be copied exceeds the upper limit size.

S515 is a step of a process for determining a remaining file is present, in which it is determined whether a file, for which the transfer of the data in the NAS 300 to the cloud storage 400 in S514 as the object with the real name is not successful, remains among the files updated after the previous differential upload process. In a case in which the remaining file is present, the process goes to S502 and the remaining other file is set as the file to be processed. In a case in which the remaining file is not present, the differential upload process is completed.

S517 is a step of an upload completion process, in which the migration program 309 in the NAS 300 ends the process. The upload completion in S517 includes a case of halting the differential upload to end the migration program 309 since time-out is determined in S509.

While it is described herein that Steps S502 to S514 depicted in FIGS. 5A and 5B are executed to process the files one by one, a plurality of files may be processed in parallel. Furthermore, while the plurality of parts are processed one by one in S506 to S508, the plurality of parts may be processed in parallel.

Figure 6A:
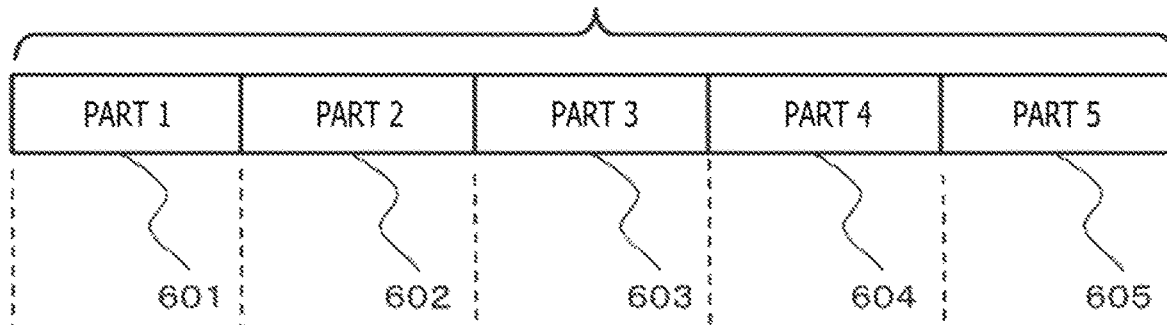
FIGS. 6A to 6C are diagrams depicting an example of splitting a file into parts according to the first embodiment.
Figure 6B:
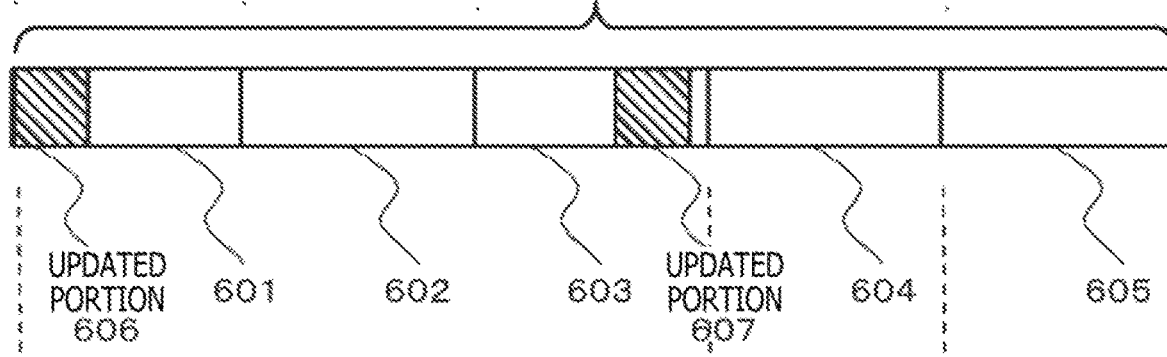
Figure 6C:
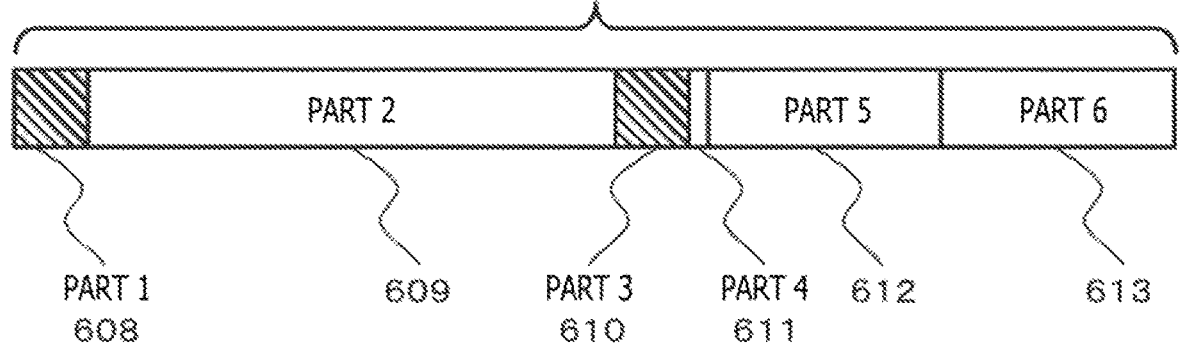

FIGS. 6A to 6C depict an example of splitting a file into parts according to the first embodiment. As an example, FIGS. 6A to 6C depict a relationship between part configurations at three timing, that is, time of starting file transfer, time of occurrence of update during the transfer, and time of part reconfiguration, and update occurrence portions. In FIG. 6A, as the part configuration at the time of starting transfer, the file 320 is demarcated into a plurality of parts with a preset size assumed as an upper limit size and parts 601 to 605 are created. The parts 601 to 605 are updated data that is not present in the cloud storage 400 and that is written by the client PC at the timing of starting transfer.

The preset size is, for example, 50 MB, and the preset size is actually set to a minimum size that ensures that transfer efficiency is sufficiently high at a time of transfer of the file 320 between the NAS 300 and the cloud storage 400. Setting the preset size as small as possible makes it possible to reduce a data size at a time of retransmitting data due to a transfer error or the like during the transfer.

On the other hand, increasing the preset size often enhances the transfer efficiency; however, the transfer efficiency saturates and has no change even when the preset size is increased to be equal to or larger than the certain size. For the preset size of, for example, 5 MB or 50 MB, the transfer efficiency often changes to 50% or 90%, respectively. Furthermore, for the preset size of, for example, 100 MB, the transfer efficiency is 90%; thus, the size is often the same in transfer efficiency as the size of 50 MB.

As described above, setting the preset size makes it possible to minimize the data size at the time of retransmission while making the transfer efficiency maximum.

The preset size may be changed to an arbitrary size by the client PC. Enabling the preset size to be changed in this way makes it possible to achieve optimization depending on transfer performance and characteristics of the LAN 202 or the WAN 203 that is the communication network between the NAS 300 and the cloud storage 400. A shorter response delay in the communication network often enables higher transfer efficiency than that for a longer response delay even if the preset size is small. The optimization signifies changing the preset size depending on the transfer performance and characteristics of the communication network.

In the example of FIGS. 6A to 6C, it is assumed that the transfer of the parts 601 to 603 from the NAS 300 to the cloud storage 400 is completed at the time of occurrence of the update during the transfer.

In FIG. 6B, an example of update portions is depicted in a case of occurrence of the update of the data about the file during the file transfer. In the present example, an updated portion 606 is present at a head of the part 601 and an updated portion 607 is present generally in the middle of the part 603. In FIG. 6C, parts into which the file is split after reconfiguring the file to be split into the parts is depicted. The updated portions 606 and 607 are changed to parts 608 and 610 by this reconfiguration to split the file into the parts.

The parts 608 and 610 are portions of the parts already transferred to the cloud storage 400 and are portions where the data is updated during the file transfer. The parts 608 and 610 are transferred parts to be transferred from the NAS 300 to the cloud storage 400.

A portion put between the parts 608 and 610 is a part 609. The part 609 is a portion where the data is not updated during the transfer in the parts 601 to 603. Since the parts 601 to 603 are already transferred to the cloud storage 400 as described above, data about the part 609 is already stored in the cloud storage 400. Therefore, the part 609 is a copied part to be copied from the temporary object within the cloud storage 400.

In a portion denoted by the part 603 at the time of starting the transfer in (A), a portion in rear of the updated portion 607 is changed to a part 611. The part 611 is a copied part similarly to the part 609. Furthermore, a portion denoted by the part 604 and a portion denoted by the part 605 are changed to parts 612 and 613, respectively. Since the parts 612 and 613 are data that is not transferred to the cloud storage 400 yet, the parts 612 and 613 are transferred parts to be transferred from the NAS 300 to the cloud storage 400.

As described above, the file is reconfigured to be split into parts in such a manner that the portions updated during the transfer, the transferred and not-updated portions, and the not-transferred portions are handled as different parts. Without the part reconfiguration as described in the present embodiment, it is required to retransfer all the data about the parts 601 and 603. However, according to the present embodiment, reconfiguring the file to be split into parts makes it possible to reduce a size of transfer data transferred from the NAS 300 to the cloud storage 400.

Figure 7:
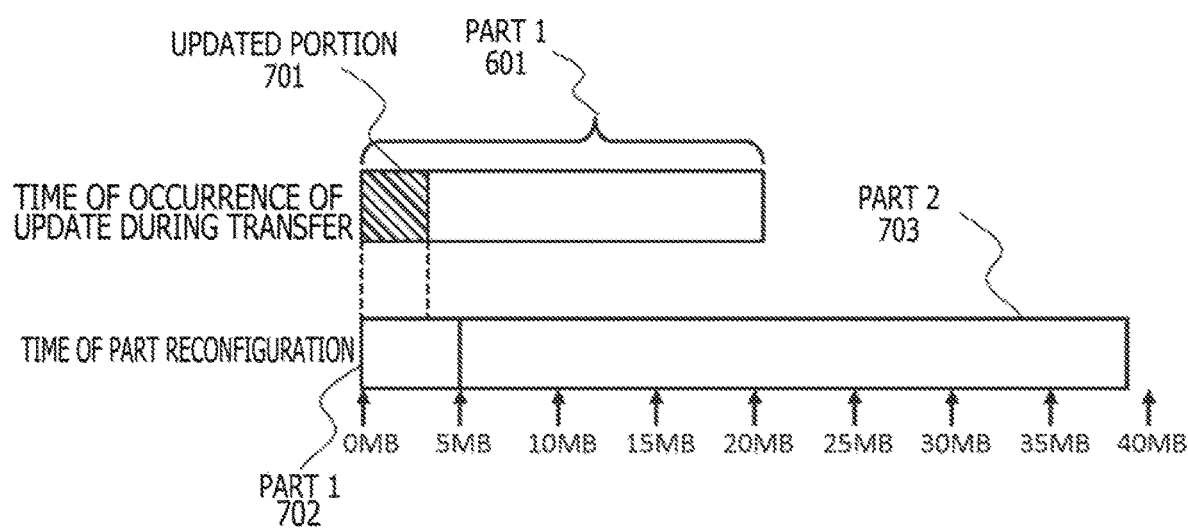
FIG. 7 is a diagram depicting another example of splitting a file into parts according to the first embodiment.

FIG. 7 is a diagram depicting another example of splitting a file into parts according to the first embodiment. The example of FIG. 7 is an example of reconfiguring a file to be split into parts for the update of data in a case in which a minimum size of a Multipart Upload part is specified in the cloud storage 400. FIG. 7 depicts part 1 of the file depicted in FIG. 6A and neighboring portions thereof.

In the example of FIG. 7, an updated portion 701 is in a range of 3.5 MB from the head of the part 601.

It is assumed herein that the minimum size of the Multipart Upload part is limited to 5 MB in the cloud storage 400, as described above. Owing to this, in reconfiguring the file to be split into parts, one part 702 at the minimum size is in a range of 5 MB from the head of the file. A part 703 is formed in rear of the part 702.

It is also assumed herein that the parts up to the range of the part 703 are already transferred to the cloud storage 400 before the occurrence of data update.

Since the part 702 contains the updated portion, the part 702 is a transferred part to be transferred from the NAS 300 to the cloud storage 400. On the other hand, the part 703 is a copied part to be copied from the temporary object within the cloud storage 400.

As described so far, in the present embodiment, for the updated portion at the size smaller than the minimum size of the part, the part containing a not-updated portion is formed so that the part containing the updated portion is the minimum size. The part becomes the transferred part. It is thereby possible to restrain the data volume to be transferred within a minimum volume while satisfying the limitation on the minimum size of the part preset in the cloud storage 400. A part minimum size condition can be set for suppressing an excessive increase in the number of parts. Furthermore, the minimum size of the part makes it possible to reduce the number of parts temporally stored while the Multipart Upload session is underway and to facilitate data management in a case in which the cloud storage 400 supports the Multipart Upload API.

The temporary object according to the present embodiment will be described. The temporary object is formed by the differential upload process depicted in FIGS. 5A and 5B. The object name (alias) other than the object name (real name) of the normal object read by the NAS 300 from the cloud storage 400 for reproducing is assigned to the temporary object.

Reproducing will be described. Corruption of data about the file often occurs in the NAS 300. Furthermore, to increase a free capacity of the storage device 322 in the NAS 300, the data about the file is often deleted to form the file into a stub file. In these cases, data about the file is not present in the NAS 300; thus, when a file read request is issued from the client PC 201, the NAS 300 reproduces data from the object present in the cloud storage 400.

When the data about a file is uploaded to the cloud storage 400, the NAS 300 stores an object name in the cloud storage 400 per file. Furthermore, at a time of reproducing the data about the file, the NAS 300 designates the object name stored in advance and issues a reproducing request to the cloud storage 400. Data about a desired object is thereby transferred from the cloud storage 400 to the NAS 300.

While the NAS 300 stores the object name in the present embodiment as described above, the management of the temporary object is not limited to this example. As another example, a predetermined name that makes an object distinguishable as the temporary object may be assigned to the temporary object. For example, as a naming rule for the object name of the temporary object, an object name may be uniquely defined from a file name and the object name may be set to be able to clearly indicate that the object name refers to the temporary object. By doing so, it is unnecessary for the NAS 300 to store therein the object name that is assigned to the object in the cloud storage 400.

For example, it is conceivable that a full path name of a file is used as the object name or an i-node number of the file is added to the object name. As described above, it is unnecessary for the NAS 300 to hold the object name, so that it is possible to reduce information stored in the NAS 300 and to make effective use of a storage capacity. In a case of designating an object name under the above naming rule, the object name is changed in the cloud storage 400 when the full-path or the i-node number is changed.

Moreover, in the present embodiment, with the configuration such that a plurality of bases, like bases X and Y depicted in FIG. 1, are connected to the same cloud storage 400, the NAS 300 at any base can reproduce the files stored in the cloud storage 400. For example, the files stored in the cloud storage 400 by a NAS 300X at the base X can be reproduced by a NAS 300Y at the base Y.

To enable the NAS 300Y at the other base Y to reproduce the file objects that have been stored in the cloud storage 400 by the NAS 300X at the base, the NAS 300X at the base X stores a list of files stored in the cloud storage 400, and a table in which a list is created such that object names in the cloud storage 400 and file names both of which correspond to the files are made to correspond to one another, as a list object with a predetermined object name assigned to the list object in the cloud storage 400. The NAS 300Y at the other base Y can read the list object from the cloud storage 400 with the help of the object names. The NAS 300Y refers to the list object, generates the files described in the list of files in the list object in the NAS 300Y, reads the objects corresponding to the files from the cloud storage 400, and writes data to the generated files. The NAS 300Y can thereby reproduce the files that have been stored in the cloud storage 400 by the NAS 300X.

It is noted that the NAS 300X does not publish information about the temporary objects in the list object at this time. Furthermore, the NAS 300 having stored a temporary object in the cloud storage 400 stores the object name of the temporary objects therein so that the temporary object is distinguishable by the object name. For example, the temporary object may be recorded in a list other than a list of the real name object after completion of upload. Data about each temporary object is not reproduced by the NAS 300 from the cloud storage 400 as data about the file accessible from the client PC 201. The temporary object is the data different from data written by the client PC 201 and is internal data unnecessary for the other client PC to access. If the data about the temporary object is accessible from the NAS 300 other than the NAS 300 that stores the temporary object, the client PC 201 possibly reads unnecessary data. For this reason, in the present embodiment, the temporary object stored by the client PC at a certain base is made inaccessible from the other client PC.

Furthermore, the object name different from that of the normal object (real name object) is assigned to the temporary object in the present embodiment; however, the present invention is not limited to this example. As another example, the same object name as that of the normal object may be assigned to the temporary object and a version that can distinguish the temporary object from the normal object may be assigned to the temporary object. In that case, a process that can prevent false reading of the temporary object from the client PC 201 even if the same file name as that of the normal object is assigned to the temporary object may be added. For example, flag information (identification information) indicating the temporary object may be written to metadata about the temporary object. At a time of reproducing data from the cloud storage 400, the NAS 300 may read first the flag and then read the data after confirming that the object is not the temporary object.

Second Embodiment

A second embodiment differs from the first embodiment in respects to be described later. The second embodiment is similar to the first embodiment in respects that are not particularly described with respect to the second embodiment.

Figure 8:
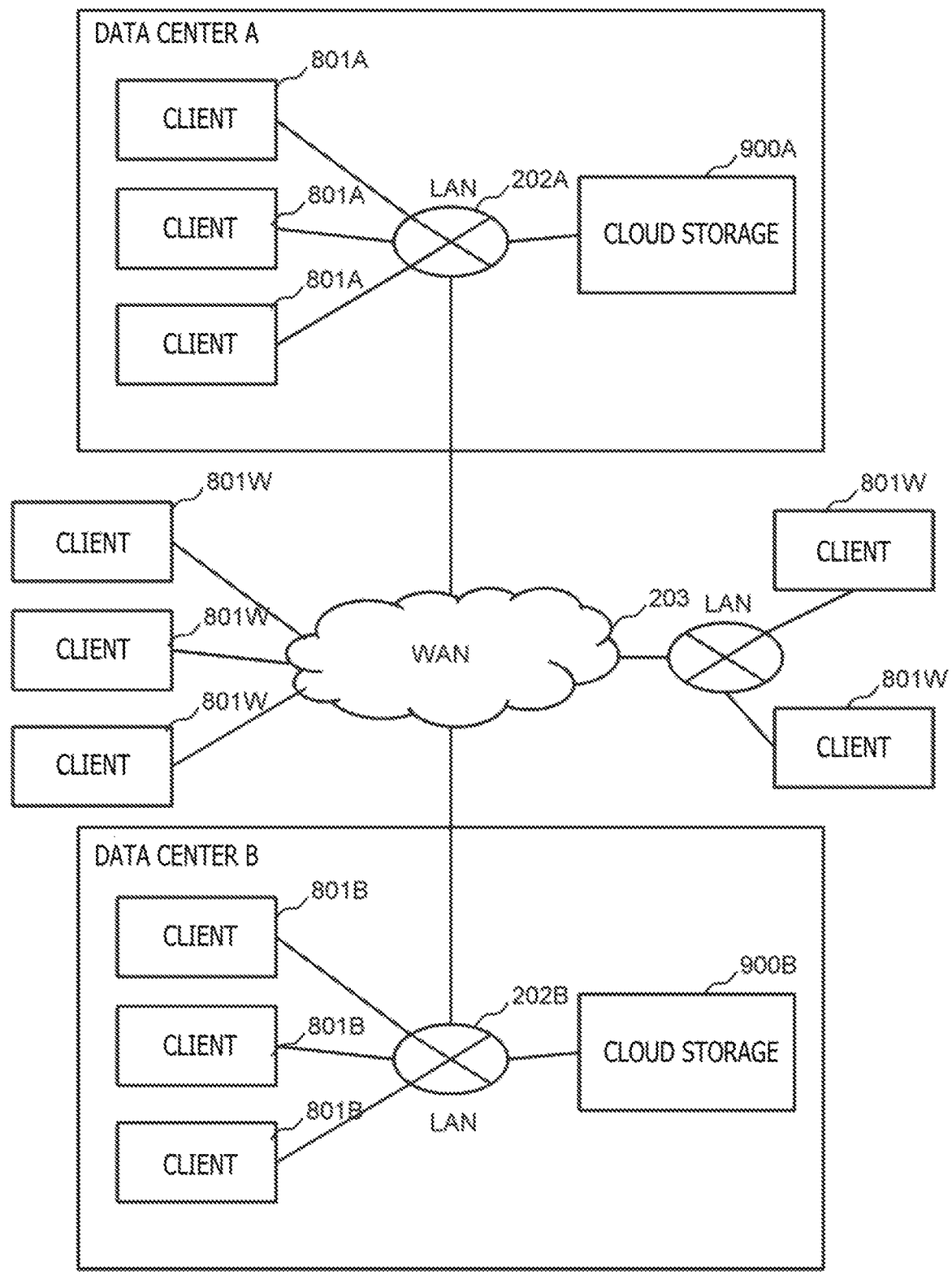
FIG. 8 is a block diagram depicting a schematic configuration of a computing machine system according to a second embodiment.

FIG. 8 is a block diagram depicting a schematic configuration of a computing machine system according to the second embodiment. Data centers A and B are provided and connected to each other via a WAN 203. In actuality, the number of data centers is not necessarily two but may be three or more. The data centers are each connected to the WAN 203 via the LAN 202. In each data center, clients 801 are connected to a cloud storage 900 via the LAN 202.

Clients 801 outside of the data centers are also connected to the WAN 203. Clients 801W outside of the data centers may be connected to the WAN 203 either directly or via the LAN 202 between the clients 801W and the WAN 203.

The clients 801 are connected to a communication network such as the WAN 203 or the LAN 202. The clients 801 each incorporate therein a cloud storage connection program. The cloud storage connection program records data stored in each client in the cloud storage 900. In addition, the cloud storage connection program reproduces data about an object stored in the cloud storage 900. The cloud storage connection program records and reproduces data in and from the cloud storage 900 through the REST interface using the HTTP.

The clients 801 may be either substantial or virtual and are not limited to specific apparatuses as long as the clients 801 are information processing apparatuses on each of which the cloud storage connection program runs. For example, the clients 801 are virtual machines. An OS for a PC (personal computer) or a server runs on each of the virtual machines. Alternatively, the clients 801 may be substantial information processing apparatuses such as smartphones, PCs, servers, and tablet terminals connected to the communication network.

The cloud storage 900 is a storage that is disposed in each data center, that is accessible from each client 801 by way of the communication network, and that stores data about the client 801. The cloud storage 900 transfers data to the other cloud storage 900 disposed in the other data center, duplicates or moves an object, data about part of an object, metadata, and the like stored in the cloud storage 900 to the other cloud storages 900. Duplication will be also referred to as "replication" and movement will be also referred to as "migration," hereinafter.

The replication is to transfer and store data stored in the cloud storage 900 to and in the other cloud storage 900. The migration differs from the replication in that the cloud storage 900 deletes the data stored therein after transfer of the data to the other cloud storage 900.

The cloud storage 900 manages data in units of objects, and receives a request to record part or entirety of an object or a request to reproduce part or entirety of the object from each client 801. In addition, the cloud storage 900 receives a request for recording or reproducing of part or entirety of an object in or by the other cloud storage 900. At a time of recording part of the object, the cloud storage 900 uses the Multipart Upload API.

Figure 9:
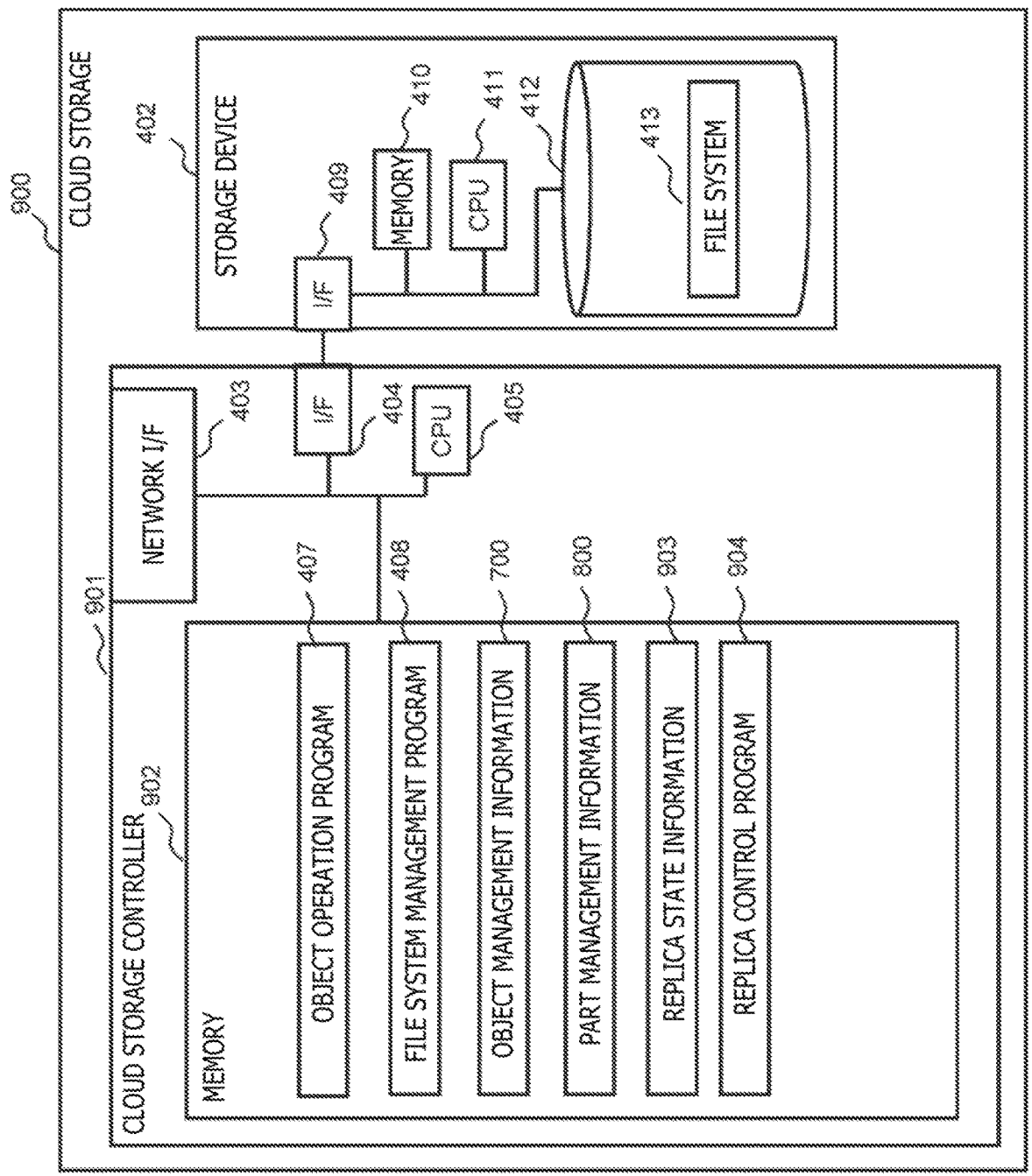
FIG. 9 is a block diagram depicting a configuration of a cloud storage 900.

FIG. 9 is a block diagram depicting a configuration of the cloud storage 900. The cloud storage 900 is similar in configuration to the cloud storage 400 of the first embodiment. However, the cloud storage 900 has a cloud storage controller 901, a memory 902, replica state information 903, and a replica control program 904 that are not provided in the cloud storage 400. On the other hand, the cloud storage 900 does not have the cloud storage 401 and the memory 406 provided in the cloud storage 400.

The cloud storage controller 901 differs from the cloud storage controller 401 of the first embodiment in that the memory 902 includes the replica state information 903 and the replica control program 904. The replica state information 903 is information for managing a state of a replica of an object.

FIG. 10 is a diagram depicting an example of a replica state information table. In the replica state information 903, information about an object name, an offset, a size, a state, and a temporary object name related to an object is recorded. Various information related to each object in the replica state information is recorded in the replica state information table per state of the object.

In the example of FIG. 10, an object with an object name abc-efg is stored in the cloud storage 900. Data about a portion in a range from an offset 0 by a size 33554432 in this object is not transferred to the other cloud storage 900. Therefore, the replica state is "not completed" indicating that replication is not completed yet. Furthermore, data about a portion in a range from an offset 33554432 by a size 134217728 is already transferred to the other cloud storage. Therefore, the replica state is "completed" indicating that replication is completed.

Moreover, data about a portion in a range from an offset 167772160 by a size 16777216 of the object is transferred to the other cloud storage 900 although the replica state is "not completed." The transferred data is contained in a temporary object tmp-A-abc-efg.

In the replica state information 903, states of data about all objects stored in the cloud storage 900 are recorded. Furthermore, when any of the clients 801 or the other cloud storage 900 updates any of the objects, a state of the updated portion in the replica state information 903 is updated to "not completed" indicating that replication is not completed yet.

The replica control program 904 rewrites the replica state information 903 in response to the update of any of the objects by any of the clients 801 or the other cloud storage 900. Furthermore, the replica control program 904 performs the replication or the migration on the other cloud storage 900 in response to the replica state.

The replica control program 904 sets the states of all the objects in the replica state information 903 to "not completed" at timing of not performing the replication or the migration at all on the other cloud storage 900.

Moreover, the replica control program 904, which acts first as a file transfer program, transfers data as the temporary object to the other cloud storage 900. The replica control program 904 then copies the temporary object to an object with the real name upon completion of the transfer of the temporary object. Upon completion of copying the temporary object to the object with the real name and completion of the replication or the migration, the replica control program 904 changes the state of the portions of the object to "completed."

When the object is updated before copying, the replica control program 904 closes the Multipart Upload session to complete the temporary object, and records the object name of the temporary object in the temporary object box of the replica state information 903. In a case of performing the replication, the replica control program 904 issues a request to copy data from the temporary object to the other cloud storages 900. The data is not transferred between the cloud storages 900. Moreover, in a case in which an object name is present in the temporary object box corresponding to a certain portion of the object and the portion of the object is updated, the replica control program 904 deletes the temporary object box.

FIGS. 11A and 11B are flowcharts depicting a file transfer process in the replication and the migration according to the second embodiment. S1001 is a process for updating replica information, in which the replica control program 904 changes the state of the updated portion of the object described in the replica state information 903 to not completed with replication in response to the update of the object by any of the clients 801 or the other cloud storage 900.

In addition, in S1001, the replica control program 904 records the object name of the temporary object generated in S516 in the temporary object box related to the updated portion of the object stored as the temporary object in the replica state information 903.

S1002 is a step of an object splitting process. The replica control program 904 splits the object to be possessed, among the objects stored in the cloud storage 900, into a plurality of parts in response to the state and the temporary object box recorded in the replica state information 903.

In S1002, the replica control program 904 splits the object into the plurality of parts so that a portion for which the state is not completed and the temporary object box is blank, a portion for which the state is not completed and an object name is present in the temporary object box, and a portion for which the state is completed in the replica state information 903 are handled as parts different from one another. Processes in S1002 other than that described above are similar to those in S504. The portion for which the state is not completed and the temporary object box is blank corresponds to a not-transferred part. The portion for which the state is not completed and the object name is present in the temporary object column corresponds to a transferred but updated part. The portion for which the state is completed corresponds to a transferred and not-updated part.

In S1003, the replica control program 904 determines whether the object name of the temporary object is described in the temporary object box in the replica state information 903. Determination that the object name of the temporary object is described indicates that the portion of the object is updated before the temporary object is copied to the normal object in the replication or the migration.

In a case in which the object is updated, the replica control program 904 goes to S507, in which the replica control program 904 transfers the updated part to the cloud storage 900 in the other data center. Furthermore, in a case in which the object is not updated, the replica control program 904 goes to S508, in which the replica control program 904 requests the cloud storage 900 in the other data center to copy the transferred part.

As described so far, according to the second embodiment, when data is updated during file transfer, it is possible to suppress the transfer of data about the not-updated portion and to transfer data efficiently in the replication and the migration of the file between the data centers.

While the embodiments of the present invention have been described, the description is exemplarily given and does not intend to limit the scope of the present invention to the configurations described above. The present invention can be implemented in various other modes.

DESCRIPTION OF REFERENCE CHARACTERS

102: Large file
104: Large file
106: Large file
107: Temporary object
108: Large file
201: Client PC
202: LAN
203: WAN
300: NAS
301: NAS controller
302: Interface
303: CPU

304: Network interface
305: Memory
314: Network interface
315: Memory
316: CPU
317: Disk
318: File system
319: Root directory
320: File
321: Directory
322: Storage device
323: Snapshot
400: Cloud storage
401: Cloud storage controller
402: Storage device
403: Network interface
404: Interface
405: CPU
406: Memory
407: Object operation program
408: File system management program
409: Interface
410: Memory
411: CPU
412: Disk
413: File system
801: Client
900: Cloud storage
901: Cloud storage controller
902: Memory

The invention claimed is:

1. A file storage that manages a file and that transfers the file to an object storage, comprising:
a network interface section that transmits and receives data through a communication network;
a file system management section that manages the file; and
a file transfer section that splits the file into a plurality of parts and that transmits the plurality of parts to the object storage, wherein
when one of the parts already transmitted to the object storage is updated by the file system management section while the plurality of parts are being transmitted to the object storage, the file transfer section
requests the object storage to generate a temporary object that is a temporarily generated object containing the transmitted and updated part by combining the parts transmitted before update,
re-splits the file into a plurality of parts so that the transmitted and updated data and not-transmitted data are handled as parts different from a part containing transmitted and not-updated data, and
transmits the part containing the transmitted and updated data or the part containing the not-transmitted data to the object storage.

2. The file storage according to claim 1, wherein
the file transfer section
splits the file into a plurality of parts to which serial numbers are assigned, transmits the plurality of parts to the object storage, and requests the object storage to combine the plurality of parts in accordance with the serial numbers,
requests the object storage, when the part transmitted to the object storage is updated by the file system management section, to create a temporary object containing the updated part,
re-splits the file into a plurality of parts to which serial numbers are assigned so that the part containing the updated data and the part containing not-transmitted data are handled as parts different from the part containing the not-updated data,
transmits the part containing the updated data and the part containing the not-transmitted data to the object storage,
requests the object storage to duplicate the part containing the not-updated data from the temporary object, and
requests the object storage to combine the part containing the updated data, the part containing the not-transmitted data, and the part containing the not-updated data in accordance with the serial numbers.

3. The file storage according to claim 1, wherein
the file transfer section
re-splits the temporary object into a plurality of parts to which serial numbers are assigned so that the updated data, not-updated data, and not-transmitted data are handled as parts different from one another,
transmits a first part containing the updated data and a second part containing the not-transmitted data to the object storage,
requests the object storage to duplicate a third part containing the not-updated data from the temporary object, and
requests the object storage to combine the first part, the second part, and the third part in accordance with the serial numbers.

4. The file storage according to claim 1, wherein
when the part transmitted to the object storage is updated by the file system management section, the file transfer section
requests the object storage to generate the temporary object by combining the plurality of parts transferred before update including the updated part.

5. The file storage according to claim 1, wherein
after re-splitting the file into the plurality of parts, the file transfer section sequentially selects the plurality of parts as parts to be processed, determines whether each of the parts is a part containing updated data, requests the object storage to duplicate the part to be processed from the temporary object in a case in which the part to be processed is a not-updated part, and transmits the part to be processed to the object storage in a case in which the part to be processed is the updated part.

6. The file storage according to claim 5, wherein
in a case in which the file is updated while the plurality of parts into which the file is re-split are sequentially processed as the parts to be processed, the file transfer section creates a temporary object by combining the parts transferred before update, and re-extracts an updated portion.

7. The file storage according to claim 1, wherein
a predetermined name is assigned to the temporary object so that the temporary object is distinguishable by the predetermined name.

8. The file storage according to claim 1, wherein
predetermined identification information is assigned to metadata about the temporary object so that the temporary object is distinguishable by the predetermined identification information.

9. The file storage according to claim 1, wherein
at a time of re-splitting the file into the plurality of parts so that the transmitted and updated data and the not-transmitted data are handled as the parts different from the part containing the transmitted and not-updated data, a not-updated data section that adjoins an updated data or not-transmitted data section and that has a capacity lower than a preset capacity is re-split into parts that are the same as a part containing the updated data and a part containing the not-transmitted data.

10. An object storage that stores a file transferred from a file storage that manages the file, comprising:

a network interface section that transmits and receives data through a communication network;

a file system management section that manages the file; and a file transfer section that receives a plurality of parts into which the file is split by the file storage, from the file storage, wherein when one of the parts received from the file storage is updated by the file storage while the file transfer section is receiving the plurality of parts from the file storage, the file transfer section receives a request to create a temporary object that is a temporarily generated object containing a transferred and updated part from the file storage via the network interface section, creates the temporary object in response to the request from the file storage, and receives a part containing the transferred and updated data or a part containing not-transmitted data among parts into which the file is re-split by the file storage so that the part containing the transferred and updated data and the part containing the not-transmitted data are handled as parts different from a part containing transferred and not-updated data, from the file storage.

11. A storage system that transfers a file from a file storage that manages the file to an object storage and that stores the file in the object storage, comprising:

the file storage that splits the file into a plurality of parts, that requests the object storage, when one of the parts already transmitted to the object storage is updated while transmitting the plurality of parts to the object storage, to generate a temporary object that is a temporarily generated object containing the transmitted and updated part by combining the parts transmitted before update, that re-splits the file into a plurality of parts so that the transmitted and updated data and not-transmitted data are handled as parts different from a part containing transmitted and not-updated data, and that transmits the part containing the transmitted and updated data or the part containing the not-transmitted data to the object storage; and the object storage that receives the plurality of parts into which the file is split from the file storage, that creates, when the part received from the file storage is updated by the file storage, a temporary object containing the transferred and updated part in response to a request from the file storage, and that receives the part containing the transferred and updated data or the part containing the not-transmitted data among parts into which the file is re-split by the file storage so that the part containing the transferred and updated data and the part containing the not-transmitted data are handled as parts different from the part containing the transferred and not-updated data, from the file storage.

* * * * *